(12) United States Patent
Hunt et al.

(10) Patent No.: US 10,814,600 B2
(45) Date of Patent: Oct. 27, 2020

(54) METHODS OF AND SYSTEMS FOR FORMING COATINGS THAT COMPRISE NON-CARBON-BASED TOPOLOGICAL INSULATORS

(71) Applicant: The Boeing Company, Chicago, IL (US)

(72) Inventors: Jeffrey H. Hunt, Thousand Oaks, CA (US); Wayne R. Howe, Irvine, CA (US); Angela W. Li, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 150 days.

(21) Appl. No.: 15/815,529

(22) Filed: Nov. 16, 2017

(65) Prior Publication Data
US 2019/0143661 A1  May 16, 2019

(51) Int. Cl.
| | | |
|---|---|---|
| B32B 37/12 | (2006.01) | |
| B32B 7/12 | (2006.01) | |
| B05D 1/28 | (2006.01) | |
| B05C 17/02 | (2006.01) | |

(52) U.S. Cl.
CPC ............... *B32B 37/12* (2013.01); *B05D 1/28* (2013.01); *B32B 7/12* (2013.01); *B05C 17/02* (2013.01); *B05D 2203/30* (2013.01); *B32B 2307/206* (2013.01); *B32B 2307/412* (2013.01)

(58) Field of Classification Search
CPC .. B32B 37/12; B32B 7/04; B32B 7/12; B32B 2307/206; B32B 2307/202; B32B 2307/412; B05D 1/28; B05D 1/36; B05D 2203/30; B05C 17/02; Y10S 322/05; H04Q 2213/307; H01B 5/00; H01B 5/002

USPC .......................................................... 156/60
See application file for complete search history.

(56) References Cited

U.S. PATENT DOCUMENTS

| | | |
|---|---|---|
| 5,508,489 A | 4/1996 | Benda et al. |
| 6,815,636 B2 | 11/2004 | Chung et al. |
| 7,515,986 B2 | 4/2009 | Huskamp |
| 9,296,007 B2 | 3/2016 | Li et al. |
| 9,630,209 B2 | 4/2017 | Hunt et al. |

(Continued)

FOREIGN PATENT DOCUMENTS

| | | | |
|---|---|---|---|
| CN | 103553000 A | * | 2/2014 |
| CN | 107620034 A | * | 1/2018 |
| WO | WO 2013/086227 A1 | | 6/2013 |

OTHER PUBLICATIONS

Kou et al., "Graphene-based Topological Insulator with an Intrinsic Bulk Band Gap above Room Temperature", Nano Letters (ACS), Nov. 5, 2013, pp. 6251-6255 (Year: 2013).*

(Continued)

*Primary Examiner* — Michael N Orlando
*Assistant Examiner* — Abhishek A Patwardhan
(74) *Attorney, Agent, or Firm* — MH2 Technology Law Group LLP

(57) ABSTRACT

A method of forming a coating can include: preparing a substrate surface with adherent characteristics; and/or applying at least one non-carbon-based topological insulator to the substrate surface to provide a topological insulator layer on the substrate surface. The at least one non-carbon-based topological insulator can have one or more of selected optical transmittance, selected thermal conductivity, selected electrical conductivity, or selected electrical resistivity.

20 Claims, 12 Drawing Sheets

(56) References Cited

U.S. PATENT DOCUMENTS

| | | | |
|---|---|---|---|
| 9,632,542 | B2 | 4/2017 | Li et al. |
| 9,732,418 | B2 | 8/2017 | Li et al. |
| 9,748,345 | B2* | 8/2017 | Sharma ................ H01L 21/477 |
| 2010/0140723 | A1 | 6/2010 | Kurtz et al. |
| 2014/0199542 | A1 | 7/2014 | Li et al. |
| 2015/0165556 | A1 | 6/2015 | Jones et al. |
| 2015/0174695 | A1 | 6/2015 | Elfstroem et al. |
| 2015/0255184 | A1 | 9/2015 | Li et al. |
| 2015/0257308 | A1 | 9/2015 | Li et al. |
| 2016/0082617 | A1 | 3/2016 | Howe et al. |
| 2016/0116679 | A1 | 4/2016 | Muendel et al. |
| 2016/0158889 | A1 | 6/2016 | Carter et al. |
| 2016/0168692 | A1* | 6/2016 | Li ............................ C09D 1/00 428/332 |
| 2016/0364062 | A1* | 12/2016 | Lu ............................ G06F 3/045 |
| 2017/0090119 | A1 | 3/2017 | Logan et al. |
| 2017/0173737 | A1 | 6/2017 | Gray |
| 2017/0194144 | A1* | 7/2017 | Duan ................ H01L 21/02381 |
| 2017/0306476 | A1 | 10/2017 | Li et al. |

OTHER PUBLICATIONS

Ando et al., "Topological Insulator Materials," Journal of the Physical Society of Japan, Invited Review Papers, 2013, pp. 1-36.

Hasan et al., "Colloquium: Topological Insulators," The Amer. Phys. Soc., Reviews of Modern Physics, vol. 82, Oct.-Dec. 2010, pp. 3045-3067.

Hills et al., "From Graphene and Topological Insulators to Weyl Semimetals," WSPC/Instruction File, 2015, pp. 1-33.

HLA, "Single Atom Extraction by Scanning Tunneling Microscope Tip—Crash and Nanoscale Surface Engineering," Nanoscale & Quantum Phenomena Institute, Physics & Astronomy Department, Ohio University, Athens, OH, date unknown, pp. 1-15.

HLA, "STM Single Atom/Molecule Manipulation and Its Application to Nanoscience and Technology," Critical Review article, J. Vac. Sci. Tech, 2005, p. 1-12.

Khanikaev et al., Photonic Topological Insulators, Nature Materials, vol. 12, Mar. 2013, pp. 233-239.

Kong et al., "Opportunities in Chemistry and Materials Science for Topological Insulators and Their Nanostructures," Nature Chemistry, vol. 3, Nov. 2011, pp. 845-849.

Kuzmenko et al., Universal Dynamical Conductance in Graphite, *DPMC, University of Geneva, Switzerland*, 2007, pp. 1-5.

Li et al., "Marginal Topological Properties of Graphene: a Comparison with Topological Insulators," *DPMC, University of Geneva, Switzerland*, 2012, pp. 1-9.

Mak et al., "Optical Spectroscopy of Graphene: From the Far Infrared to the Ultraviolet," Solid State Communications, 152 (2012), 1341-1349.

Mingareev et al., "Laser Additive Manufacturing Going Mainstream," Optics and Photonics News, Feb. 2017, 8 pages.

Moore, "The Birth of Topological Insulators," Nature, vol. 464, Insight Perspective (2010), pp. 194-198.

Peng et al., "Topological Insulator Nanostructures for Near-Infrared Transparent Flexible Electrodes," Nature Chemistry, vol. 4, Apr. 2012, pp. 281-286.

Qi et all, "Topological Insulators and Superconductors," arXiv:1008.2026v1 [cond-mat.mes-hall], (2010), pp. 1-54.

Zhang, "Viewpoint: Topological States of Quantum Matter," American Physical Society, Physics 1, 6 (2008), 3 pages.

Zhu et al., "Optical Transmittal of Multilayer Graphene," EPL, 108 (2014) 17007, 4 pages.

Gu, "Chapter 2—Laser Additive Manufacturing (AM): Classification, Processing Philosophy, and Metallurgical Mechanisms," Laser Additive Manufacturing of High-Performance Materials, 2015, XVII, pp. 15-24.

Wikipedia, Graphene, https://en.wikipedia.org/wiki/Graphene, 29 pages, downloaded Nov. 15, 2017.

Wikipedia, Scanning Tunneling Microscope, https://en.wikipedia.org/wiki/Scanning_Tunneling_Microscope, 9 pages.

Wikipedia, "Nanometre," https://en.wikipedia.org/wiki/Nanometre, 2 pages.

Wikipedia, "Carbon Nanotube," https://en.wikipedia.org/wiki/Carbon_Nanotube, 22 pages.

DAS et al., "Topological Insulator Bi2Se3/Si-Nanowire-Based p-n Junction Diode for High-Performance Near-Infrared Photodetector," ACS Applied Materials & Interfaces, 2017, 22788-22798.

* cited by examiner

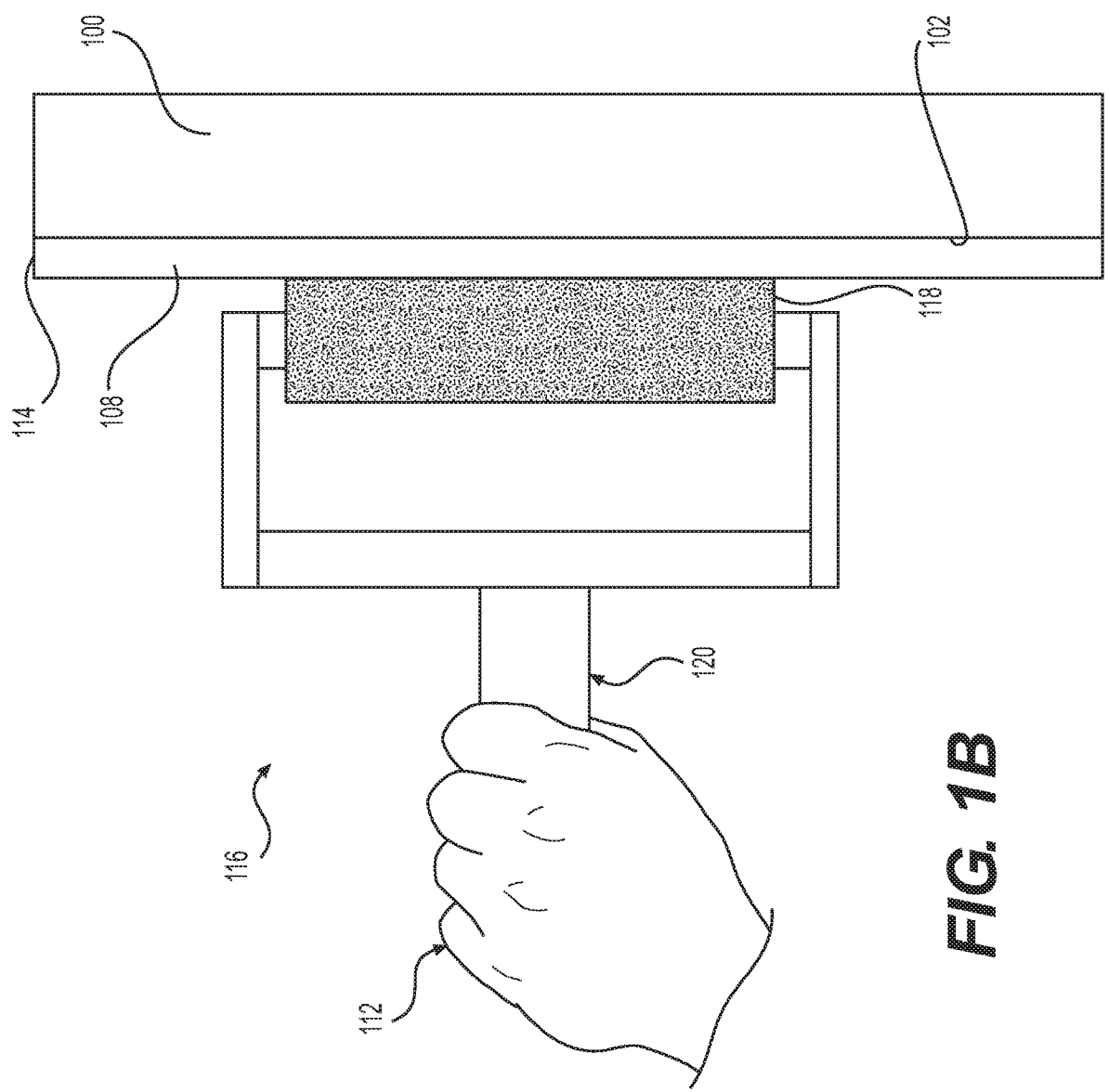

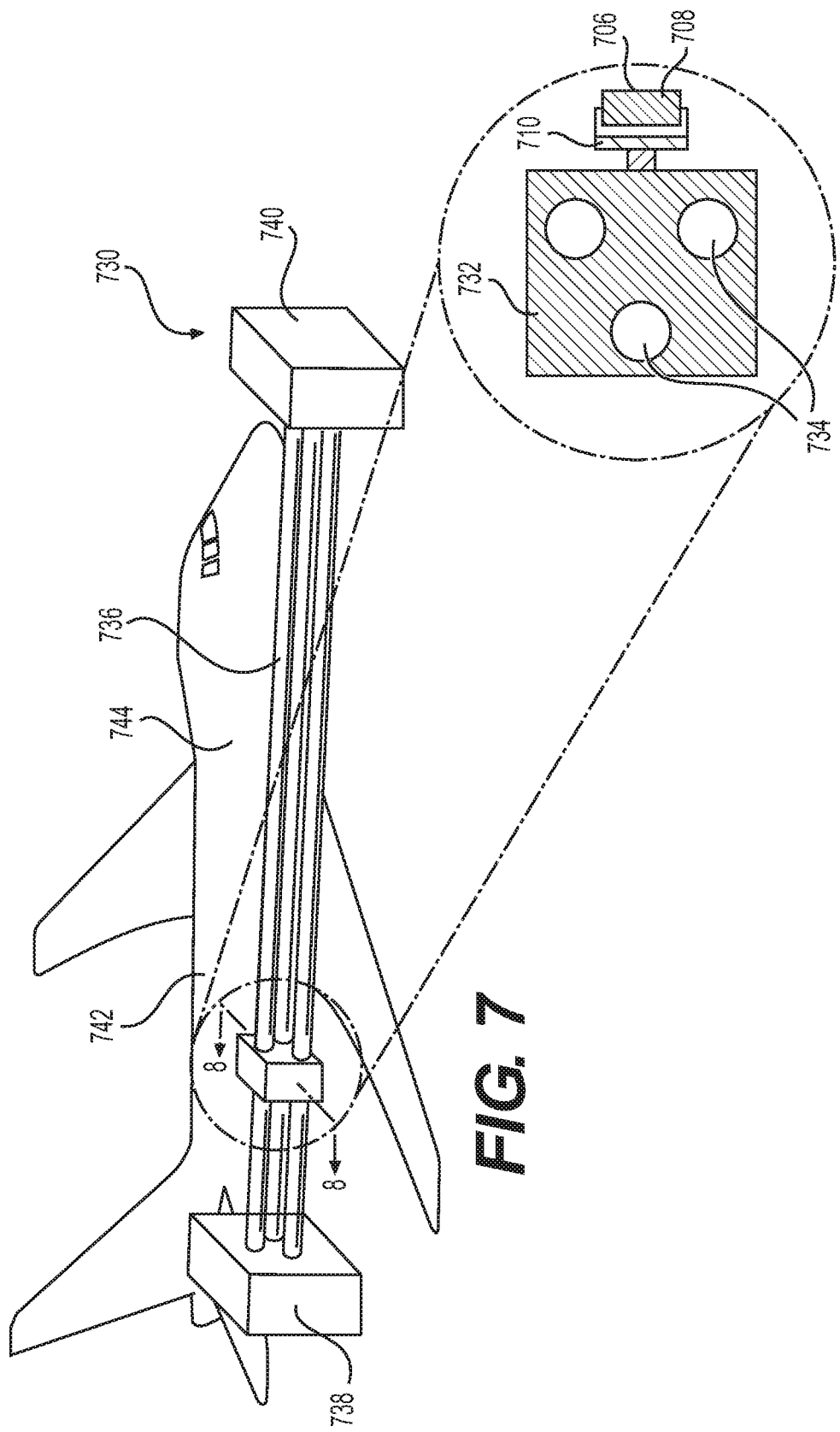

METHODS OF AND SYSTEMS FOR FORMING COATINGS THAT COMPRISE NON-CARBON-BASED TOPOLOGICAL INSULATORS

FIELD

The subject matter disclosed herein generally relates to coatings that comprise non-carbon-based topological insulators. The subject matter disclosed herein also relates to methods of and systems for forming coatings that comprise non-carbon-based topological insulators.

BACKGROUND

Coatings generally may be used for various purposes, such as providing protection from the environment; improving electrical, mechanical, or optical properties; enhancing chemical resistance, corrosion resistance, or fire resistance; or providing hydrophilic or hydrophobic characteristics.

Certain coatings can exhibit specific advantages when compared to other known coatings. Such advantages can include, for example, improved protection from ultraviolet radiation or enhanced fire retardancy.

Many industries, such as the aerospace, automotive, defense, electronics, maritime, and rail-transport industries, continually seek to push the boundaries of what has come before in coating technologies. Thus, there is a need for improved coatings, as well as improved methods of and systems for forming coatings.

SUMMARY

The present disclosure is directed to coatings that comprise non-carbon-based topological insulators, and methods of and systems for forming coatings that comprise non-carbon-based topological insulators.

In some examples, a method of forming a coating can comprise: preparing a substrate surface with adherent characteristics; and/or applying at least one non-carbon-based topological insulator with selected optical transmittance to the substrate surface to provide a topological insulator layer on the substrate surface.

In some examples, the preparing of the substrate surface with the adherent characteristics can comprise applying first adhesive material to the substrate surface to provide an adhesive surface.

In some examples, the applying of the at least one non-carbon-based topological insulator to the substrate surface can comprise rolling a source of the at least one non-carbon-based topological insulator over the adhesive surface to provide the topological insulator layer on the adhesive surface.

In some examples, the method can further comprise: rolling an adhesive roller over the topological insulator layer to remove some, but not all, of the topological insulator layer.

In some examples, the adhesive roller can comprise second adhesive material.

In some examples, the second adhesive material can be the same as the first adhesive material.

In some examples, the second adhesive material can differ from the first adhesive material.

In some examples, the applying of the at least one non-carbon-based topological insulator to the substrate surface can comprise rolling a source of the at least one non-carbon-based topological insulator over the substrate surface to provide the topological insulator layer on the substrate surface.

In some examples, the method can further comprise: rolling an adhesive roller over the topological insulator layer to remove some, but not all, of the topological insulator layer.

In some examples, the adhesive roller can comprise second adhesive material.

In some examples, the second adhesive material can be the same as the first adhesive material.

In some examples, the second adhesive material can differ from the first adhesive material.

In some examples, the at least one non-carbon-based topological insulator can comprise at least one three-dimensional, non-carbon-based topological insulator.

In some examples, a single crystal layer of the at least one three-dimensional, non-carbon-based topological insulator can have optical transmittance greater than or equal to 98% for electromagnetic radiation at normal incidence with a wavelength greater than or equal to 200 nanometers ("nm") and less than or equal to 800 nm.

In some examples, a method of forming a coating can comprise: preparing a substrate surface with adherent characteristics; and/or applying at least one non-carbon-based topological insulator with selected thermal conductivity to the substrate surface to provide a topological insulator layer on the substrate surface.

In some examples, the at least one non-carbon-based topological insulator can comprise at least one three-dimensional, non-carbon-based topological insulator.

In some examples, the at least one non-carbon-based topological insulator can have thermal conductivity less than or equal to 100 Watts per meter-degree Kelvin ("W/(m-K)") at 300 K.

In some examples, a method of forming a coating can comprise: preparing a substrate surface with adherent characteristics; and/or applying at least one non-carbon-based topological insulator with selected electrical conductivity to the substrate surface to provide a topological insulator layer on the substrate surface.

In some examples, the at least one non-carbon-based topological insulator can comprise at least one three-dimensional, non-carbon-based topological insulator.

In some examples, the at least one non-carbon-based topological insulator can have electrical conductivity greater than or equal to $5 \times 10^3$ siemens per meter ("S/m") at 300 K and less than or equal to $5 \times 10^7$ S/m at 300 K.

In some examples, a method of forming a coating can comprise: preparing a substrate surface with adherent characteristics; and/or applying at least one non-carbon-based topological insulator with selected electrical resistivity to the substrate surface to provide a topological insulator layer on the substrate surface.

In some examples, the at least one non-carbon-based topological insulator can comprise at least one three-dimensional, non-carbon-based topological insulator.

In some examples, the at least one non-carbon-based topological insulator can have electrical resistivity greater than or equal to $1 \times 10^{-5}$ Ohm-meter ("$\Omega$-m") at 300 K and less than or equal to 1 $\Omega$-m at 300 K.

It is to be understood that both the foregoing general description and the following detailed description are exemplary and explanatory only, and are not restrictive of the present teachings, as claimed.

DRAWINGS

The above and/or other aspects and advantages will become more apparent and more readily appreciated from the following detailed description of examples, taken in conjunction with the accompanying drawings, in which:

FIG. 1B shows a sectional view of components involved in a method of and/or a system for forming a coating, according to some examples of the disclosed methods and systems;

FIG. 7 shows a perspective view of components involved in a method of and/or a system for forming a coating, according to some examples of the disclosed methods and systems; and FIG. 8 shows a sectional view of components involved in a method of and/or a system for forming a coating, according to some examples of the disclosed methods and systems, taken along line 8-8 of FIG. 7.

DETAILED DESCRIPTION

Figure 1A:
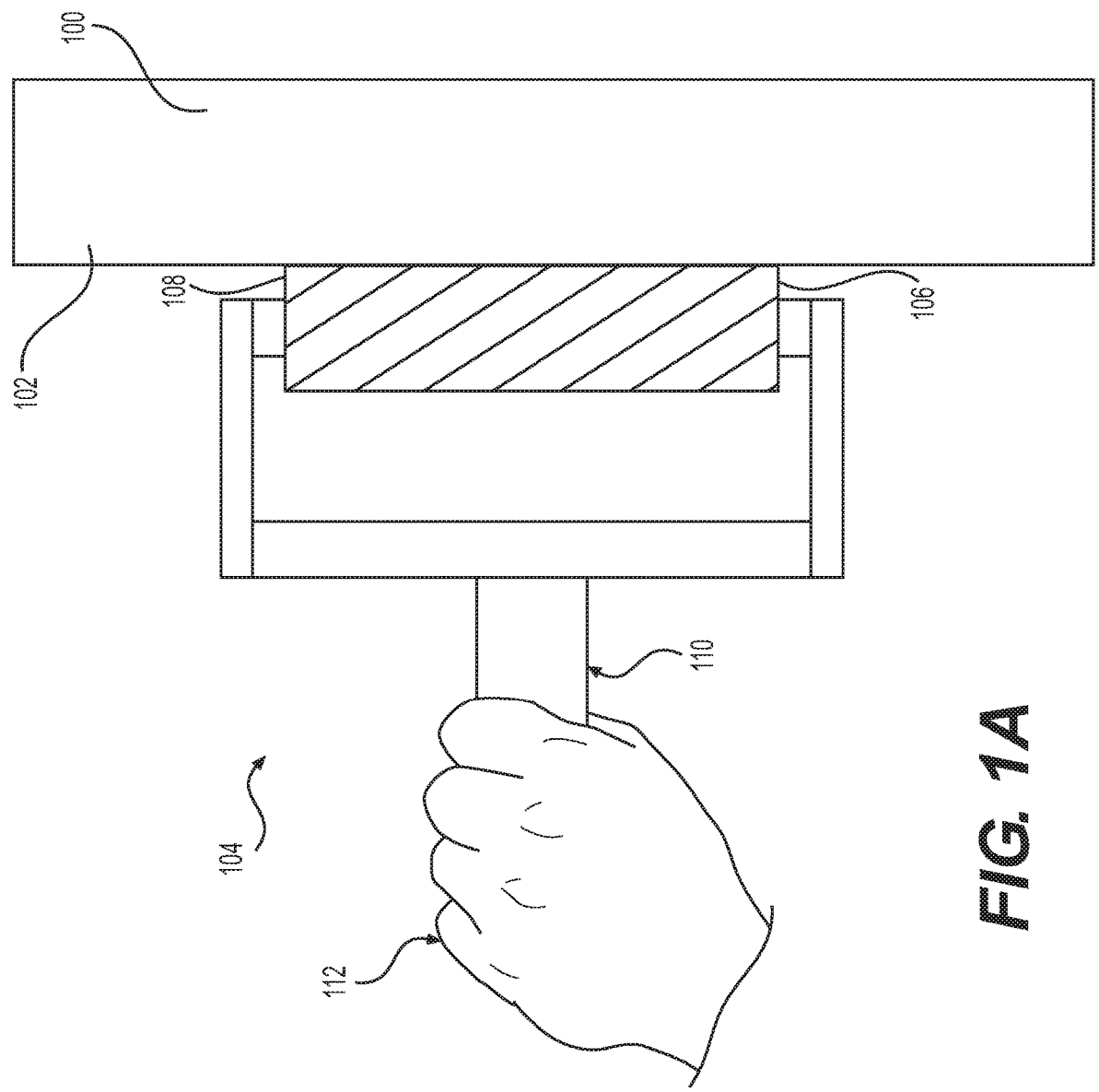
FIG. 1A shows a sectional view of components involved in a method of and/or a system for forming a coating, according to some examples of the disclosed methods and systems.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to one of ordinary skill in the art. In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as understood by one of ordinary skill in the art. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The present disclosure is directed to coatings that comprise non-carbon-based topological insulators.

In some examples, a method of forming a coating comprises: preparing a substrate surface with adherent characteristics; and applying at least one non-carbon-based topological insulator to the substrate surface to provide a topological insulator layer on the substrate surface.

As used herein, the term "substrate" means any solid on which a coating or layer of different material can be deposited.

As used herein, the term "adherent" means tends to stick to.

As used herein, the term "carbon" means the nonmetallic element of atomic number 6, including any isotopes thereof. Forms of carbon include, for example, amorphous carbon, diamond, graphene, and graphite.

As used herein, the term "topological insulator" means a two-dimensional ("2D") or three-dimensional ("3D") material with time-reversal symmetry and topologically protected edge states (2D) or surface states (3D). For example, a 2D topological insulator generally will not conduct current across the surface of the 2D material, but can carry current along the edges of the 2D material. In another example, a 3D topological insulator generally will not conduct current through the bulk of the 3D material, but can carry current along the surface of the 3D material.

As used herein, the term "non-carbon-based topological insulator" means a topological insulator whose crystal structure does not include carbon.

Some 2D, non-carbon-based topological insulators can comprise, consist essentially of, or consist of, for example, one or more of antimony (Sb), bismuth (Bi), selenium (Se), or tellurium (Te), or combinations thereof.

Some 2D, non-carbon-based topological insulators can comprise, consist essentially of, or consist of, but are not limited to, CdTe/HgTe/CdTe quantum wells, AlSb/InAs/GaSb/AlSb quantum wells, Bi bilayers, monolayer low-buckled HgSe, monolayer low-buckled HgTe, strained HgTe, or silicene, or combinations thereof.

Some 3D, non-carbon-based topological insulators can comprise, consist essentially of, or consist of, for example, one or more of antimony (Sb), bismuth (Bi), selenium (Se), or tellurium (Te), or combinations thereof.

The at least one non-carbon-based topological insulator can comprise, consist essentially of, or consist of, but are not limited to, one or more of $Bi_{1-x}Sb_x$ (0<x<1) (e.g., $Bi_{0.9}Sb_{0.1}$), $Bi_{1-x}Te_x$ (0<x<1), $Bi_{1-x}Te_x$ (0<x<1), Sb, $Bi_2Se_3$, $Bi_2Te_3$, $Sb_2Te_3$, $Bi_2Te_2Se$, $(Bi,Sb)_2Te_3$ (e.g., $(Bi_{0.2}Sb_{0.8})_2Te_3$), $Bi_{2-x}Sb_xTe_{3-y}Se_y$ (0≤x≤2; 0≤y≤3), $Bi_{2-x}Sb_xTe_{3-y}Se_y$ (0≤x≤2; 1≤y≤3) (e.g., $Bi_2Te_{1.95}Se_{1.05}$, $BiSbTe_{1.25}Se_{1.75}$), $Bi_2Te_{1.6}S_{1.4}$, $Bi_{1.1}Sb_{0.9}Te_2S$, $Sb_2Te_2Se$, $Bi_2(Te,Se)_2(Se,S)$, $TlBiSe_2$, $TlBiTe_2$, $TlBi(S_{1-x}Se_x)_2$ (0.5≤x≤1), $Pb(Bi_{1-x}Sb_x)_2Te_4$ (0≤x≤1), $PbBi_2Te_4$, $PbSb_2Te_4$, $PbBi_4Te_7$, $GeBi_2Te_4$, $GeBi_{4-x}Sb_xTe_7$ (0≤x≤4), $(PbSe)_5(Bi_2Se_3)_3$, $(PbSe)_5(Bi_2Se_3)_6$, $(Bi_2)(Bi_2Se_{2.6}S_{0.4})$, $Bi_4Se_3$, $Bi_4Se_{2.6}S_{0.4}$, $(Bi_2)(Bi_2Te_3)_2$, SnTe, $Pb_{1-x}Sn_xSe$ (0<x<1), $Pb_{1-x}Sn_xTe$ (0<x<1), $Pb_{0.77}Sn_{0.23}Se$, $Bi_{1.84-x}Fe_{0.16}Ca_xSe_3$ (0≤x<1.84), $Cr_{0.08}(Bi_{0.1}Sb_{0.9})_{1.92}Te_3$, $(Dy_xBi_{1-x})_2Te_3$ (0<x<1), $Ni_xBi_{2-x}Se_3$ (0<x<2), $(Ho_xBi_{1-x})_2Se_3$ (0≤x<1), $Ag_2Te$, $SmB_6$, $Bi_{14}Rh_3I_9$, $Bi_{2-x}Ca_xSe_3$ (0<x<2), $Bi_{2-x}Mn_xTe_3$ (0<x<2) (e.g., $Bi_{1.91}Mn_{0.09}Te_3$, $Bi_{1.96}Mn_{0.04}Te_3$, $Bi_{1.98}Mn_{0.02}Te_3$), $Ba_2BiBrO_6$, $Ba_2BiIO_6$, $Ca_2BiBrO_6$, $Ca_2BiIO_6$, $Sr_2BiBrO_6$, or $Sr_2BiIO_6$, or combinations thereof.

As used herein, the term "layer" means a thickness of material laid on, formed on, or spread over a surface, body, or portion of a surface or body. A layer can cover the surface, body, or portion of the surface or body, or form an overlying part or segment of material that covers the surface, body, or portion of the surface or body. A layer can have constant or variable thickness.

Individual atoms have quantized discrete energy levels which are occupied by each individual atom's electrons. In the case of a solid, however, many atoms are in close proximity to one another and the discrete energy levels of the individual atoms combine to form so-called "energy bands." These energy bands are defined by energies that can be determined by spectroscopically measuring the bandgap in the solid, for example, according to known spectroscopic methods, such as wavelength modulation spectroscopy. Generally, photons having energy values that lie below the bandgap will transmit through the solid, while photons having energy values at or above the bandgap will be strongly absorbed. In wavelength modulation spectroscopy, the relative absorption of the photons is correlated with the band density of states.

The energy bands describe electron behavior within the solid. For example, in these energy bands, electron energy can be described as a function of the electron's wave-vector as the electron travels through the solid. Macroscopic behavior of many electrons in the solid—electrical conductivity, thermal conductivity, and the like—result from the band structure. Ordinarily, the geometric construction of solids do not have an effect on the band structure. However, for very thin solids such as graphene, not only does the solid's geometry change, but so too does its band structure. That is, for thin solids, the electron behavior changes as the geometry of the solid changes. Thus, whether a solid is a defined as a "2D-structure" or a "3D-structure" depends on the solid's band structure. For example, graphene is monoatomic and its 2D band structure only exists when it is one atomic layer thick. The addition of more atomic layers (e.g., from single-layer graphene to few-layer graphene) not only increases graphene's thickness, but also changes its band structure toward its 3D configuration. In contrast, topological insulators comprise several different atoms and can be molecularly engineered. Thus, unlike graphene which faces the aforementioned issues to changes in its band structure, a topological insulator largely maintains its 2D band structure even as the material's thickness is changed.

The at least one non-carbon-based topological insulator can have selected optical transmittance.

As used herein, the term "optical transmittance" means the fraction of incident electromagnetic power that is transmitted through a substance, mixture, or material.

The selected optical transmittance can provide improved optical properties, such as improved optical clarity, improved transparency, and/or improved protection from ultraviolet radiation. This can be accomplished by controlling optical transmittance and/or optical non-transmittance—including one or both of reflection or absorption—over spectral regimes defined by the desired use(s). The at least one non-carbon-based topological insulator can be tuned to achieve this type of control, which provides significant flexibility in design. The effects of such control can be measured, for example, using standard laboratory optical equipment, as understood by one of ordinary skill in the art.

In some examples, the at least one non-carbon-based topological insulator with the selected optical transmittance can comprise at least one two-dimensional, non-carbon-based topological insulator. In some examples, the at least one non-carbon-based topological insulator with the selected optical transmittance can comprise at least one three-dimensional, non-carbon-based topological insulator.

The optical transmittance of the at least one non-carbon-based topological insulator can be measured using, for example, a spectrometer over a broad range of wavelengths (such as when measuring transmitted light across the visible spectrum) or a narrow range of wavelengths (such as when measuring reflected laser light at a specific wavelength). However, any method of measuring the optical transmittance not inconsistent with the present application can be used, including any suitable instrumentation. The measured wavelengths may or may not be within the range of visible light (e.g., ultraviolet, visible light, infrared).

For example, a single crystal layer of the at least one non-carbon-based topological insulator can have an optical transmittance greater than or equal to 90%, greater than or equal to 95%, greater than or equal to 96%, greater than or equal to 97%, greater than or equal to 98%, greater than or equal to 98.5%, greater than or equal to 99%, or greater than or equal to 99.5% for electromagnetic radiation at normal incidence with a wavelength greater than or equal to 200 nanometers ("nm") and less than or equal to 800 nm (e.g., visible light plus ultraviolet and infrared). One or more dopants can be used to tune the at least one non-carbon-based topological insulator in order to achieve these levels of optical transmittance, as understood by one of ordinary skill in the art.

In another example, a 100-crystal-layer thickness of the at least one non-carbon-based topological insulator can have an optical transmittance greater than or equal to 30% and less than or equal to 90%, greater than or equal to 40% and less than or equal to 85%, or greater than or equal to 50% and less than or equal to 80% for electromagnetic radiation at normal incidence with a wavelength greater than or equal to 200 nm and less than or equal to 800 nm. One or more dopants can be used to tune the at least one non-carbon-based topological insulator in order to achieve these levels of optical transmittance, as understood by one of ordinary skill in the art.

A single crystal layer of the at least one non-carbon-based topological insulator, for example, generally is more flexible and has a higher optical transmittance than a 100-crystal-layer thickness of the at least one non-carbon-based topological insulator. In contrast, a 100-crystal-layer thickness of the at least one non-carbon-based topological insulator, for example, generally is stronger than a single crystal layer of the at least one non-carbon-based topological insulator.

For applications in which signal level and signal-to-noise ratio of an optical beam are relatively high, a lower value of optical transmittance can be suitable. However, for applications in which signal level, signal-to-noise ratio, or both are relatively low (e.g., where every bit of signal matters), a higher value of optical transmittance can be required for satisfactory performance. Availability, cost, environmental issues, and other factors also can play into selection of the at least one non-carbon-based topological insulator.

In yet another example, a single crystal layer of the at least one non-carbon-based topological insulator can have an optical transmittance greater than or equal to 90%, greater than or equal to 95%, greater than or equal to 96%, greater than or equal to 97%, greater than or equal to 98%, greater than or equal to 98.5%, greater than or equal to 99%, or greater than or equal to 99.5% for electromagnetic radiation at normal incidence with a wavelength greater than or equal to 400 nm and less than or equal to 700 nm (e.g., 400 nm-700 nm approximately representing the spectrum of visible light). One or more dopants can be used to tune the at least one non-carbon-based topological insulator in order to achieve these levels of optical transmittance, as understood by one of ordinary skill in the art.

In still another example, a 100-crystal-layer thickness of the at least one non-carbon-based topological insulator can have an optical transmittance greater than or equal to 30% and less than or equal to 90%, greater than or equal to 40% and less than or equal to 85%, or greater than or equal to 50% and less than or equal to 80% for electromagnetic radiation at normal incidence with a wavelength greater than or equal to 400 nm and less than or equal to 700 nm. One or more dopants can be used to tune the at least one non-carbon-based topological insulator in order to achieve these levels of optical transmittance, as understood by one of ordinary skill in the art.

In yet still another example, a single crystal layer of the at least one non-carbon-based topological insulator can have an optical transmittance greater than or equal to 90%, greater than or equal to 95%, greater than or equal to 96%, greater than or equal to 97%, greater than or equal to 98%, greater than or equal to 98.5%, greater than or equal to 99%, or greater than or equal to 99.5% for electromagnetic radiation at normal incidence with a wavelength equal to 400 nm, 450 nm, 500 nm, 550 nm, 600 nm, 650 nm, or 700 nm (e.g., visible light). One or more dopants can be used to tune the at least one non-carbon-based topological insulator in order to achieve these levels of optical transmittance, as understood by one of ordinary skill in the art.

In a further example, a 100-crystal-layer thickness of the at least one non-carbon-based topological insulator can have an optical transmittance greater than or equal to 30% and less than or equal to 90%, greater than or equal to 40% and less than or equal to 85%, or greater than or equal to 50% and less than or equal to 80% for electromagnetic radiation at normal incidence with a wavelength equal to 400 nm, 450 nm, 500 nm, 550 nm, 600 nm, 650 nm, or 700 nm. One or more dopants can be used to tune the at least one non-carbon-based topological insulator in order to achieve these levels of optical transmittance, as understood by one of ordinary skill in the art.

The at least one non-carbon-based topological insulator can have selected thermal conductivity.

As used herein, the term "thermal conductivity" means the ability to transfer heat through a substance, mixture, or material.

The selected thermal conductivity can provide improved thermodynamic properties, such as improved protection from the environment, improved control over energy dissipation, and/or improved control over energy retention. In some examples, if the at least one non-carbon-based topological insulator is adjacent to another material, lower values of thermal conductivity can indicate better protection of the adjacent material against changes in ambient temperature by the at least one non-carbon-based topological insulator. In some examples, if the at least one non-carbon-based topological insulator is adjacent to another material, higher values of thermal conductivity can indicate better dissipation of heat away from the adjacent material through the at least one non-carbon-based topological insulator.

In some examples, the at least one non-carbon-based topological insulator with the selected thermal conductivity can comprise at least one two-dimensional, non-carbon-based topological insulator. In some examples, the at least one non-carbon-based topological insulator with the selected thermal conductivity can comprise at least one three-dimensional, non-carbon-based topological insulator.

For example, a single crystal layer of the at least one non-carbon-based topological insulator can have a thermal conductivity less than or equal to 1,000 Watts per meter-degree Kelvin ("W/(m-K)") at 300 K, less than or equal to 500 W/(m-K) at 300 K, less than or equal to 250 W/(m-K) at 300 K, less than or equal to 100 W/(m-K) at 300 K, less than or equal to 50 W/(m-K) at 300 K, less than or equal to 25 W/(m-K) at 300 K, less than or equal to 10 W/(m-K) at 300 K, or less than or equal to 5 W/(m-K) at 300 K. One or more dopants can be used to tune the at least one non-carbon-based topological insulator in order to achieve these levels of thermal conductivity, as understood by one of ordinary skill in the art.

In another example, a single crystal layer of the at least one non-carbon-based topological insulator can have a thermal conductivity greater than or equal to 1 W/(m-K) at 300 K and less than or equal to 10 W/(m-K) at 300 K, greater than or equal to 10 W/(m-K) at 300 K and less than or equal to 50 W/(m-K) at 300 K, greater than or equal to 50

W/(m-K) at 300 K and less than or equal to 100 W/(m-K) at 300 K, greater than or equal to 100 W/(m-K) at 300 K and less than or equal to 250 W/(m-K) at 300 K, greater than or equal to 250 W/(m-K) at 300 K and less than or equal to 500 W/(m-K) at 300 K, or greater than or equal to 500 W/(m-K) at 300 K and less than or equal to 1,000 W/(m-K) at 300 K. One or more dopants can be used to tune the at least one non-carbon-based topological insulator in order to achieve these levels of thermal conductivity, as understood by one of ordinary skill in the art.

The at least one non-carbon-based topological insulator can have selected electrical conductivity.

As used herein, the term "electrical conductivity" means the ability to transfer electricity through a substance, mixture, or material.

The selected electrical conductivity can provide improved electrical properties, such as enhanced fire resistance, improved control over energy dissipation, and/or improved control over energy retention. Electrical conductivity has a direct physical tie to thermal conductivity, which can control energy dissipation and/or retention. With better control over electrical conductivity, static charges can be better regulated, leading to better fire resistance.

In some examples, the at least one non-carbon-based topological insulator with the selected electrical conductivity can comprise at least one two-dimensional, non-carbon-based topological insulator (the selected electrical conductivity being along edges of the 2D material). In some examples, the at least one non-carbon-based topological insulator with the selected electrical conductivity can comprise at least one three-dimensional, non-carbon-based topological insulator (the selected electrical conductivity being along surfaces of the 3D material).

For example, a single crystal layer of the at least one non-carbon-based topological insulator can have an electrical conductivity greater than or equal to $5 \times 10^3$ S/m at 300 K and less than or equal to $5 \times 10^7$ S/m at 300 K, greater than or equal to $1 \times 10^4$ S/m at 300 K and less than or equal to $1 \times 10^7$ S/m at 300 K, greater than or equal to $5 \times 10^4$ S/m at 300 K and less than or equal to $5 \times 10^6$ S/m at 300 K, or greater than or equal to $1 \times 10^5$ S/m at 300 K and less than or equal to $1 \times 10^6$ S/m at 300 K. One or more dopants can be used to tune the at least one non-carbon-based topological insulator in order to achieve these levels of electrical conductivity, as understood by one of ordinary skill in the art. In some examples, lower electrical conductivity can improve the insulative nature of the at least one non-carbon-based topological insulator. In some examples, higher electrical conductivity can improve the ability to transmit electrical signals through the at least one non-carbon-based topological insulator.

In another example, a single crystal layer of the at least one non-carbon-based topological insulator can have an electrical conductivity greater than or equal to $5 \times 10^3$ S/m at 300 K and less than or equal to $5 \times 10^4$ S/m at 300 K, greater than or equal to $1 \times 10^4$ S/m at 300 K and less than or equal to $1 \times 10^5$ S/m at 300 K, greater than or equal to $5 \times 10^4$ S/m at 300 K and less than or equal to $5 \times 10^5$ S/m at 300 K, greater than or equal to $1 \times 10^5$ S/m at 300 K and less than or equal to $1 \times 10^6$ S/m at 300 K, greater than or equal to $5 \times 10^5$ S/m at 300 K and less than or equal to $5 \times 10^6$ S/m at 300 K, greater than or equal to $1 \times 10^6$ S/m at 300 K and less than or equal to $1 \times 10^7$ S/m at 300 K, or greater than or equal to $5 \times 10^6$ S/m at 300 K and less than or equal to $5 \times 10^7$ S/m at 300 K. One or more dopants can be used to tune the at least one non-carbon-based topological insulator in order to achieve these levels of electrical conductivity, as understood by one of ordinary skill in the art.

The at least one non-carbon-based topological insulator can have selected electrical resistivity.

As used herein, the term "electrical resistivity" means resistance to the transfer of electricity through a substance, mixture, or material.

The selected electrical resistivity can provide improved electrical properties, such as enhanced fire resistance, improved control over energy dissipation, and/or improved control over energy retention. In some examples, lower electrical resistivity can improve the ability to transmit electrical signals through the at least one non-carbon-based topological insulator. In some examples, higher electrical resistivity can improve the insulative nature of the at least one non-carbon-based topological insulator.

In some examples, the at least one non-carbon-based topological insulator with the selected electrical resistivity can comprise at least one two-dimensional, non-carbon-based topological insulator (the selected electrical resistivity being between edges of the 2D material). In some examples, the at least one non-carbon-based topological insulator with the selected electrical resistivity can comprise at least one three-dimensional, non-carbon-based topological insulator (the selected electrical resistivity being between surfaces of the 3D material).

For example, the at least one non-carbon-based topological insulator can have an electrical resistivity greater than or equal to $1 \times 10^{-5}$ Ω-m at 300 K and less than or equal to 1 Ω-m at 300 K, greater than or equal to $5 \times 10^{-5}$ Ω-m at 300 K and less than or equal to $5 \times 10^{-1}$ Ω-m at 300 K, greater than or equal to $1 \times 10^{-4}$ Ω-m at 300 K and less than or equal to $1 \times 10^{-1}$ Ω-m at 300 K, greater than or equal to $5 \times 10^{-4}$ Ω-m at 300 K and less than or equal to $5 \times 10^{-2}$ Ω-m at 300 K, or greater than or equal to $1 \times 10^{-3}$ Ω-m at 300 K and less than or equal to $1 \times 10^{-2}$ Ω-m at 300 K. One or more dopants can be used to tune the at least one non-carbon-based topological insulator in order to achieve these levels of electrical resistivity, as understood by one of ordinary skill in the art.

In another example, the at least one non-carbon-based topological insulator can have an electrical resistivity greater than or equal to $1 \times 10^{-5}$ Ω-m at 300 K and less than or equal to $1 \times 10^{-4}$ Ω-m at 300 K, greater than or equal to $5 \times 10^{-5}$ Ω-m at 300 K and less than or equal to $5 \times 10^{-4}$ Ω-m at 300 K, greater than or equal to $1 \times 10^{-4}$ Ω-m at 300 K and less than or equal to $1 \times 10^{-3}$ Ω-m at 300 K, greater than or equal to $5 \times 10^{-4}$ Ω-m at 300 K and less than or equal to $5 \times 10^{-3}$ Ω-m at 300 K, greater than or equal to $1 \times 10^{-3}$ Ω-m at 300 K and less than or equal to $1 \times 10^{-2}$ Ω-m at 300 K, greater than or equal to $5 \times 10^{-3}$ Ω-m at 300 K and less than or equal to $5 \times 10^{-2}$ Ω-m at 300 K, greater than or equal to $1 \times 10^{-2}$ Ω-m at 300 K and less than or equal to $1 \times 10^{-1}$ Ω-m at 300 K, greater than or equal to $5 \times 10^{-2}$ Ω-m at 300 K and less than or equal to $5 \times 10^{-1}$ Ω-m at 300 K, or greater than or equal to $1 \times 10^{-1}$ Ω-m at 300 K and less than or equal to 1 Ω-m at 300 K. One or more dopants can be used to tune the at least one non-carbon-based topological insulator in order to achieve these levels of electrical resistivity, as understood by one of ordinary skill in the art.

In some examples, the at least one non-carbon-based topological insulator can comprise at least one two-dimensional ("2D"), non-carbon-based topological insulator. In some examples, the at least one non-carbon-based topological insulator can comprise at least one three-dimensional ("3D"), non-carbon-based topological insulator. In either the 2D or 3D case, one or more dopants can be used to tune the at least one non-carbon-based topological insulator in order to achieve one or more desired properties, such as selected optical transmittance, selected thermal conductivity, selected electrical conductivity, or selected electrical resistivity, as understood by one of ordinary skill in the art.

The at least one non-carbon-based topological insulator can be applied to the substrate surface with adherent characteristics to provide a topological insulator layer on the substrate surface.

The preparing of a substrate surface with adherent characteristics can comprise selecting a substrate surface that is inherently adhesive with respect to the at least one non-carbon-based topological insulator. Such inherently adhesiveness may be based, for example, on intermolecular forces (e.g., dipole forces, van der Waals forces).

Any substrate surface not inconsistent with the present application can be used. The substrate surface can comprise one or more of glass, metal, plastic, or semiconductor. The substrate surface can comprise composite material, such as fiberglass composite. The substrate surface can comprise a coated surface, including a surface coated with previously applied coating(s) or layer(s) of the at least one non-carbon-based topological insulator or one or more other topological insulators.

The substrate surface can be substantially flat or planar. The substrate surface can be curved. Such a curved surface can be concave, convex, or include one or more concave, convex, or concave and convex portions (e.g., saddle-shaped).

In some examples, the substrate surface can comprise a surface of a window or windshield. In some examples, the substrate surface can comprise a surface of an electronic or optical component. In some examples, the substrate surface can comprise an exterior surface of a vehicle, such as an aircraft (e.g., airplane, airship, blimp, dirigible, glider, helicopter, hot-air balloon), land vehicle (e.g., automobile, bus, monorail, tank, train, truck), or watercraft (e.g., amphibian, boat, landing craft, ship, submarine, or submersible). The at least one non-carbon-based topological insulator can be applied to the exterior surface of such a vehicle.

The applying of the at least one non-carbon-based topological insulator to the substrate surface with adherent characteristics can be repeated a desired number of times to provide a thicker topological insulator layer.

The preparing of a substrate surface with adherent characteristics can comprise applying first adhesive material to the substrate surface to provide an adhesive surface.

Any adhesive material not inconsistent with the present application can be used as the first adhesive material. The first adhesive material can be, for example, a fluid material or a solid material. In some examples, the first adhesive material can comprise an animal protein-based adhesive material, such as albumin glue, casein glue, collagen glue, meat glue, or a combination thereof. In some examples, the first adhesive material can comprise bone glue, fish glue, hide glue, hoof glue, rabbit skin glue, or a combination thereof. In some examples, the first adhesive material can comprise plant-based adhesive material, such as resin, starch, or a combination thereof. In some examples, the first adhesive material can comprise Canada balsam resin, coccoina, gum arabic resin, latex, methyl cellulose, mucilage, resorcinol resin, urea-formaldehyde resin, or a combination thereof. The first adhesive material can also comprise synthetic adhesive material, such as synthetic monomer glue, synthetic polymer glue, or a combination thereof. In some examples, the first adhesive material can comprise acrylic glue, acrylonitrile, cyanoacrylate, or a combination thereof. In some examples, the first adhesive material can comprise epoxy putty, epoxy resin, ethylene-vinyl acetate, phenol formaldehyde resin, polyamide, polyester resin, polyethylene hot-melt glue, polypropylene glue, polysulfide, polyurethane, polyvinyl acetate, polyvinyl alcohol, polyvinyl chloride, polyvinylpyrrolidone, rubber cement, silicone, styrene acrylate copolymer, or a combination thereof. In some examples, the first adhesive material can comprise solvent-based adhesive. In some examples, the first adhesive material can comprise wet paint or primer, partially dried paint or primer, or other coating material(s).

The first adhesive material can be selected based on desired adhesion strength to the at least one non-carbon-based topological insulator. The adhesion strength of the first adhesive material to the at least one non-carbon-based topological insulator can be measured in any manner not inconsistent with the present application. The adhesion strength of the first adhesive material to the at least one non-carbon-based topological insulator can be measured according to ASTM International Standard D4541 and/or International Organization for Standardization ("ISO") Standard 4624. The first adhesive material can have an adhesion strength to the at least one non-carbon-based topological insulator that is greater than, equal to, or less than the inter-sheet bonding energy of the at least one non-carbon-based topological insulator. Selecting an adhesive material having an adhesion strength that is greater than the inter-sheet bonding energy, for example, can permit the formation of a topological insulator layer on an adhesive substrate surface by, for example, rolling a source of the at least one non-carbon-based topological insulator over the adhesive substrate layer, including without exertion of excessive force toward the substrate surface. The methods described herein can provide simple and cost-effective methods of forming a coating that comprises the at least one non-carbon-based topological insulator, including over large areas.

To provide the substrate surface with adherent characteristics, the first adhesive material can be applied to the substrate surface in any manner not inconsistent with the present application. In some examples, the first adhesive material can be sprayed onto the substrate surface. In some examples, the first adhesive material can be brushed, daubed, or rolled onto the substrate surface. In some examples, the substrate surface can be dipped into the first adhesive material.

The first adhesive material can be applied to a substrate surface in any amount not inconsistent with the present application. The first adhesive material can form an adhesive layer on the substrate surface (e.g., an adhesive surface). In some examples, the adhesive layer can have an average thickness of up to about 100 nm, up to about 200 nm, up to about 300 nm, up to about 400 nm, up to about 500 nm, up to about 600 nm, up to about 700 nm, up to about 800 nm, up to about 900 nm, or up to about 1,000 nm. In some examples, the adhesive layer can have an average thickness greater than or equal to about 100 nm and less than or equal to about 1,000 nm. The average thickness of the adhesive layer can be, for example, about 100 nm, about 200 nm, about 300 nm, about 400 nm, about 500 nm, about 600 nm, about 700 nm, about 800 nm, about 900 nm, or about 1,000 nm. In some examples, the adhesive layer can have an average thickness of up to about 100 µm, up to about 200 µm, up to about 300 µm, up to about 400 µm, up to about 500 µm, up to about 600 µm, up to about 700 µm, up to about 800 µm, up to about 900 µm, or up to about 1,000 µm. In some examples, the adhesive layer can have an average thickness greater than or equal to about 100 µm and less than or equal to about 1,000 µm. The average thickness of the adhesive layer can be, for example, about 100 µm, about 200 µm, about 300 µm, about 400 µm, about 500 µm, about 600 µm, about 700 µm, about 800 µm, about 900 µm, or about 1,000 µm.

As used herein, the term "up to", when used in connection with an amount or quantity, means that the amount is at least a detectable amount or quantity (e.g., "up to about 1 mm" means at least a detectable amount and less than or equal to about 1 millimeter).

The preparing of a substrate surface can further comprise drying the first adhesive material after formation of a topological insulator layer or a final coating (discussed below). In the alternative, no drying of the first adhesive material can be carried out.

The at least one non-carbon-based topological insulator can be applied to the adhesive surface to provide a topological insulator layer on the adhesive surface.

The topological insulator layer can have any thickness not inconsistent with the present application.

In some examples, the topological insulator layer can have an average thickness of about 1 nm, about 2 nm, about 3 nm, about 4 nm, about 5 nm, about 6 nm, about 7 nm, about 8 nm, about 9 nm, or about 10 nm. In some examples, the topological insulator layer can have an average thickness of up to about 10 nm, up to about 20 nm, up to about 30 nm, up to about 40 nm, or up to about 50 nm. In some examples, the topological insulator layer can have an average thickness of up to about 100 nm, up to about 200 nm, up to about 300 nm, up to about 400 nm, or up to about 500 nm. The thickness, to first order, affects the strength of the topological insulator layer. And through tuning, you can create a band structure that is a hybrid of a 2D-structure and a 3D-structure, so that you have macroscopic physical properties that affect electrical conductivity, electrical resistivity, optical transmittance, and/or thermal conductivity.

In some examples, the topological insulator layer can have an average thickness of up to about 1 micron ("µm"), up to about 2 µm, up to about 3 µm, up to about 4 µm, or up to about 5 µm. In some examples, the topological insulator layer can have an average thickness of up to about 10 µm, up to about 20 µm, up to about 30 µm, up to about 40 µm, or up to about 50 µm. In some examples, the topological insulator layer can have an average thickness of up to about 100 µm, up to about 200 µm, up to about 300 µm, up to about 400 µm, or up to about 500 µm.

In some examples, the topological insulator layer can have an average thickness of up to about 1 millimeter ("mm"), up to about 2 mm, up to about 3 mm, up to about 4 mm, or up to about 5 mm. In some examples, the topological insulator layer can have an average thickness greater than or equal to about 1 mm and less than or equal to about 5 mm.

In some examples, the topological insulator layer can have an average thickness greater than or equal to about 1 nm and less than or equal to about 10 nm. In some examples, the topological insulator layer can have an average thickness greater than or equal to about 10 nm and less than or equal to about 100 nm. In some examples, the topological insulator layer can have an average thickness greater than or equal to about 100 nm and less than or equal to about 1,000 nm.

In some examples, the topological insulator layer can have an average thickness greater than or equal to about 1 µm and less than or equal to about 10 µm. In some examples, the topological insulator layer can have an average thickness greater than or equal to about 10 µm and less than or equal to about 100 µm. In some examples, the topological insulator layer can have an average thickness greater than or equal to about 100 µm and less than or equal to about 1,000 µm. In some examples, the topological insulator layer can have an average thickness greater than or equal to about 1 mm and less than or equal to about 5 mm.

The applying of the at least one non-carbon-based topological insulator to the adhesive surface can be repeated a desired number of times to provide a thicker topological insulator layer. The applying of the at least one non-carbon-based topological insulator to the adhesive surface and the applying of the first adhesive material can be repeated a desired number of times to provide a thicker topological insulator layer and/or a stack of two or more topological insulator layers separated by one or more adhesive layers.

The at least one non-carbon-based topological insulator can be applied by rolling a source of the at least one non-carbon-based topological insulator over the surface to provide the topological insulator layer on the surface.

Any source of the at least one non-carbon-based topological insulator not inconsistent with the present application can be used. In some examples, the source of the at least one non-carbon-based topological insulator comprises at least one 2D topological insulator. In some examples, the source of the at least one non-carbon-based topological insulator comprises two or more 2D topological insulators. In some examples, the source of the at least one non-carbon-based topological insulator comprises at least one 3D topological insulator. In some examples, the source of the at least one non-carbon-based topological insulator comprises two or more 3D topological insulators. In some examples, the source of the at least one non-carbon-based topological insulator comprises at least one 2D topological insulator and at least one 3D topological insulator.

A source of the at least one non-carbon-based topological insulator can have any morphology not inconsistent with the present application, including a morphology configured to facilitate rolling of the source of the at least one non-carbon-based topological insulator on a substrate surface to provide a topological insulator layer on the substrate surface.

The source of the at least one non-carbon-based topological insulator can comprise a rod comprising the at least one non-carbon-based topological insulator. As used herein, the term "rod" means a substantially smooth object having an aspect ratio greater than 1. The rod can have an aspect ratio greater than or equal to 3, greater than or equal to 4, greater than or equal to 5, greater than or equal to 7, greater than or equal to 10, greater than or equal to 12, or greater than or equal to 15.

The rod can have any size and shape not inconsistent with the present application. In some examples, the rod can have a cylindrical or substantially cylindrical shape. In some examples, the rod can have a prolate or oblate spheroid shape. In some examples, the rod can have a diamond-like shape. In some examples, the rod can have a concave or convex surface. In some examples, a rod having a concave surface can be used to apply a topological insulator layer to a convex substrate surface. In some examples, a rod having a convex surface can be used to apply a topological insulator layer to a concave substrate surface. Thus, as understood by one of ordinary skill in the art, the size and shape of the rod can be selected based on the morphology of the substrate surface.

The rod can have a tubular morphology. For example, the rod can have a drilled-out or hollow center. Such a tubular rod can be more easily coupled to a handle, holder, or other apparatus for rolling the tubular rod over the substrate surface.

The rod can have a spherical morphology. Such a sphere can have a drilled-out or hollow center in order to provide a spherical "stringed bead" morphology for coupling to a handle, holder, or other apparatus for rolling the spherical "stringed bead" over the substrate surface.

A source of the at least one non-carbon-based topological insulator can comprise an apparatus comprising a handle, and a rod or sphere comprising the at least one non-carbon-based topological insulator attached to the handle, wherein the rod or sphere is configured to roll or otherwise move when the handle is moved in a direction tangential to a surface of the rod or sphere, such as a curved surface of the rod or sphere. The handle can be gripped and operated manually by a user. The apparatus can further comprise a moveable support structure, the handle being attached to the moveable support structure. Such a moveable support structure can be a mechanized or robotic support structure, thus providing automated application of a topological insulator layer.

A topological insulator layer formed by applying a source of at least one non-carbon-based topological insulator to a substrate surface with adherent characteristics or an adhesive surface can have any chemical property, morphology, or thickness not inconsistent with the with the present application. The topological insulator layer comprises, consists essentially of, or consists of the at least one non-carbon-based topological insulator.

In some examples, a topological insulator layer can comprise greater than or equal to about 50 atom percent, greater than or equal to about 60 atom percent, greater than or equal to about 70 atom percent, greater than or equal to about 80 atom percent, greater than or equal to about 90 atom percent, greater than or equal to about 95 atom percent, greater than or equal to about 98 atom percent, or greater than or equal to about 99 atom percent of the at least one non-carbon-based topological insulator.

In some examples, the topological insulator layer can comprise greater than or equal to about 50% by weight of the at least one non-carbon-based topological insulator, greater than or equal to about 60% by weight of the at least one non-carbon-based topological insulator, greater than or equal to about 70% by weight of the at least one non-carbon-based topological insulator, greater than or equal to about 75% by weight of the at least one non-carbon-based topological insulator, greater than or equal to about 80% by weight of the at least one non-carbon-based topological insulator, greater than or equal to about 85% by weight of the at least one non-carbon-based topological insulator, greater than or equal to about 90% by weight of the at least one non-carbon-based topological insulator, or greater than or equal to about 95% by weight of the at least one non-carbon-based topological insulator.

In some examples, a topological insulator layer can comprise any number of molecular layers of the at least one non-carbon-based topological insulator not inconsistent with the present application. In some examples, the topological insulator layer can comprise, consists essentially of, or consist of a single molecular layer of the at least one non-carbon-based topological insulator. In some examples, the single molecular layer can have a flat, planar structure. In some examples, the topological insulator layer can comprise, consists essentially of, or consist of multiple molecular layers of the at least one non-carbon-based topological insulator. In some examples, the multiple molecular layers can have a flat, planar structure.

In some examples, the topological insulator layer can comprise, consists essentially of, or consist of greater than or equal to 1 and less than or equal to about 10 molecular layers of the at least one non-carbon-based topological insulator. In some examples, the topological insulator layer can comprise, consists essentially of, or consist of greater than or equal to about 10 and less than or equal to about 100 molecular layers of the at least one non-carbon-based topological insulator. In some examples, the topological insulator layer can comprise, consists essentially of, or consist of greater than or equal to about 100 and less than or equal to about 1,000 molecular layers of the at least one non-carbon-based topological insulator.

In some examples, the topological insulator layer can comprise, consists essentially of, or consist of a sufficient number of molecular layers of the at least one non-carbon-based topological insulator to provide a layer thickness of up to about 1 μm, up to about 10 μm, up to about 100 μm, up to about 1 mm, or up to about 5 mm.

A topological insulator layer can be continuous or substantially continuous across the substrate surface with adherent characteristics or the adhesive surface, as opposed to being discontinuous or unevenly disposed on such a surface. A substantially continuous layer can cover at least about 90 percent, at least about 95 percent, or at least about 99 percent of the substrate surface with adherent characteristics or the adhesive surface.

For example, a topological insulator layer can cover a substrate area greater than about 0.0001 square meters ("$m^2$"), greater than about 0.001 $m^2$, greater than about 0.01 $m^2$, greater than about 0.1 $m^2$, greater than about 1 $m^2$, greater than about 10 $m^2$, greater than about 100 $m^2$, greater than about 1,000 $m^2$, or greater than about 10,000 $m^2$, including in continuous or substantially continuous manner.

In another example, a topological insulator layer can cover a substrate area greater than about 0.0001 $m^2$ and less than about 0.001 $m^2$, greater than about 0.001 $m^2$ and less than about 0.01 $m^2$, greater than about 0.01 $m^2$ and less than about 0.1 $m^2$, greater than about 0.1 $m^2$ and less than about 1 $m^2$, greater than about 1 $m^2$ and less than about 10 $m^2$, greater than about 10 $m^2$ and less than about 100 $m^2$, greater than about 100 $m^2$ and less than about 1,000 $m^2$, greater than about 1,000 $m^2$ and less than about 10,000 $m^2$, including in continuous or substantially continuous manner.

A topological insulator layer can have a uniform or substantially uniform thickness across the across the substrate surface with adherent characteristics or the adhesive surface. A substantially uniform thickness can comprise vary by less than about 20 percent, by less than about 10 percent, or by less than about 5 percent, based on the average thickness of the topological insulator layer.

The thickness of a topological insulator layer can be selected by varying one or more parameters during deposition of the topological insulator layer on a substrate surface with adherent characteristics or an adhesive surface. The thickness of the topological insulator layer can be selected by varying the number of times or the force with which a source of the at least one non-carbon-based topological insulator is applied to or rolled across the surface, where the application of more force and/or repeated application of the source of the at least one non-carbon-based topological insulator can provide a thicker topological insulator layer. An applied force or number of repetitions can be selected using information obtained from a detector configured to determine the thickness of the topological insulator layer or coating deposited on the surface. The information can be obtained in real-time by providing information regarding the output of the detector (e.g., a measured electrical conductivity change) to an apparatus used to deposit the topological insulator layer.

Any detector not inconsistent with the present application can be used. For example, the detector can comprise an acoustic wave detector configured to determine thickness of the topological insulator layer. The detector can be configured to determine the thickness of the topological insulator layer by measuring optical transmittance of the topological insulator layer. The detector can be configured to determine thermal conductivity of the topological insulator layer. The detector can be configured to determine electrical conductivity of the topological insulator layer. The detector can be configured to determine electrical resistivity of the topological insulator layer.

Comparison of a measured acoustic wave value, optical transmittance value, thermal conductivity value, electrical conductivity value, or electrical resistivity value with a theoretical value for the topological insulator layer of a specified thickness can permit a user to determine the thickness of the topological insulator layer. In some examples, a measured optical transmittance value for a multiple-layer thickness of the at least one non-carbon-based topological insulator will be, to first order, a multiple of a measured optical transmittance value for a single-layer thickness.

The method of forming the coating can further comprise: rolling an adhesive roller over the topological insulator layer to remove some, but not all, of the topological insulator layer.

The method of forming the coating can further comprise: applying a topological insulator remover to the topological insulator layer to remove some, but not all, of the topological insulator layer to provide a final coating. Applying the topological insulator remover to the topological insulator layer can comprise rolling an adhesive roller over the topological insulator layer to remove some, but not all, of the topological insulator layer to provide the final coating. The final coating can have a lower average thickness than the topological insulator layer.

In some examples, no topological insulator remover may be applied to the topological insulator layer. Thus, the topological insulator layer can serve as the final coating.

The applying of the topological insulator remover to the topological insulator layer to remove some, but not all, of the topological insulator layer to provide the final coating can comprise applying the topological insulator remover in any manner not inconsistent with the present application. The topological insulator remover can be blotted, daubed, pressed, rolled, or rubbed on the topological insulator layer.

The topological insulator remover can comprise any apparatus not inconsistent with the present application. In some examples, the topological insulator remover can comprise one or more planar surfaces that provide abrasion, adhesion, and/or friction to the topological insulator layer. In some examples, the topological insulator remover can comprise one or more curved surfaces in addition to or instead of the one or more planar surfaces.

Applying the topological insulator remover to a topological insulator layer can comprise rolling an adhesive roller over the topological insulator layer. Any adhesive roller not inconsistent with the present application can be used. The adhesive roller can comprise, for example, a second adhesive material on a rolling surface of the adhesive roller.

A curved, planar, or rolling surface of a topological insulator remover (e.g., adhesive roller) can have any shape, size, and/or morphology not inconsistent with the present application. The curved, planar, or rolling surface of the topological insulator remover can have the same shape, size, and/or morphology as the source of the at least one non-carbon-based topological insulator. In some examples, the curved or rolling surface of the topological insulator remover can be relatively flexible or stiff, and/or can be shaped as concave or convex. In some examples, the curved or rolling surface of the topological insulator remover can have the shape of a convex lens (e.g., a prolate or oblate spheroid). In some examples, the curved, planar, or rolling surface of the topological insulator remover can be relatively flexible or stiff, and/or can be shaped as a right circular cylinder. In some examples, the curved, planar, or rolling surface of the topological insulator remover can be selected based on the morphology of the substrate surface and/or topological insulator layer.

The topological insulator remover can comprise a rod comprising an adhesive roller. The rod can have any size and shape not inconsistent with the present application. In some examples, the rod can have a cylindrical or substantially cylindrical shape. In some examples, the rod can have a prolate or oblate spheroid shape. In some examples, the rod can have a diamond-like shape.

The rod can have a concave or convex surface. In some examples, a rod having a concave surface can be used to remove some, but not all, of a topological insulator layer from a convex substrate surface with adherent characteristics or from a convex adhesive surface by, for example, rolling the adhesive roller over the topological insulator layer. In some examples, a rod having a convex surface can be used to remove some, but not all, of a topological insulator layer from a concave substrate surface with adherent characteristics or from a concave adhesive surface by, for example, rolling the adhesive roller over the topological insulator layer. Thus, as understood by one of ordinary skill in the art, the size and shape of the rod can be selected based on the morphology of the surface and/or topological insulator layer.

The rod can have a tubular morphology. For example, the rod can have a drilled-out or hollow center. Such a tubular rod can be more easily coupled to a handle, holder, or other apparatus for rolling the tubular rod over the surface and/or topological insulator layer.

The rod can have a spherical morphology. Such a sphere can have a drilled-out or hollow center in order to provide a spherical "stringed bead" morphology for coupling to a handle, holder, or other apparatus for rolling the spherical "stringed bead" over the surface and/or topological insulator layer.

The thickness of a topological insulator layer can be selected by varying one or more parameters during removal of some, but not all, of the topological insulator layer. In some examples, the thickness of the topological insulator layer can be selected by varying the number of times or the force with which a topological insulator remover (e.g., adhesive roller) is rolled across the surface, where the application of more force and/or repeated application of the topological insulator remover can provide a thinner topological insulator layer. In some examples, an applied force or number of repetitions can be selected using information obtained from a detector configured to determine the thickness of the topological insulator layer or coating remaining on the surface. The information can be obtained in real-time by providing information regarding the output of the detector (e.g., a measured electrical conductivity change) to an apparatus used to remove some, but not all, of the topological insulator layer.

Any detector not inconsistent with the present application can be used. For example, the detector can comprise an acoustic wave detector configured to determine thickness of the topological insulator layer. In some examples, the detector can be configured to determine the thickness of the topological insulator layer by measuring optical transmittance of the topological insulator layer. In some examples, the detector can be configured to determine thermal conductivity of the topological insulator layer. In some examples, the detector can be configured to determine electrical conductivity of the topological insulator layer. In some examples, the detector can be configured to determine electrical resistivity of the topological insulator layer.

Comparison of a measured acoustic wave value, optical transmittance value, thermal conductivity value, electrical conductivity value, or electrical resistivity value with a theoretical value for the topological insulator layer of a specified thickness can permit a user to determine the thickness of the topological insulator layer.

The topological insulator remover can comprise an apparatus comprising a handle and a rod or sphere comprising, for example, an adhesive roller attached to the handle, wherein the rod or sphere is configured to roll or otherwise move when the handle is moved in a direction tangential to a surface of the rod or sphere, such as a curved surface of the rod or sphere. In some examples, the handle can be gripped and operated manually by a user. In some examples, the apparatus can further comprise a moveable support structure, the handle being attached to the moveable support structure. Such a moveable support structure can be a mechanized or robotic support structure, thus providing automated removal of some, but not all, of a topological insulator layer.

The adhesive roller can comprise second adhesive material. Any adhesive material not inconsistent with the present application can be used as the second adhesive material. The second adhesive material can be, for example, a fluid material or a solid material. In some examples, the second adhesive material can comprise an animal protein-based adhesive material, such as albumin glue, casein glue, collagen glue, meat glue, or a combination thereof. In some examples, the second adhesive material can comprise bone glue, fish glue, hide glue, hoof glue, rabbit skin glue, or a combination thereof. In some examples, the second adhesive material can comprise plant-based adhesive material, such as resin, starch, or a combination thereof. In some examples, the second adhesive material can comprise Canada balsam resin, coccoina, gum arabic resin, latex, methyl cellulose, mucilage, resorcinol resin, urea-formaldehyde resin, or a combination thereof. The second adhesive material can also comprise synthetic adhesive material, such as synthetic monomer glue, synthetic polymer glue, or a combination thereof. In some examples, the second adhesive material can comprise acrylic glue, acrylonitrile, cyanoacrylate, or a combination thereof. In some examples, the second adhesive material can comprise epoxy putty, epoxy resin, ethylene-vinyl acetate, phenol formaldehyde resin, polyamide, polyester resin, polyethylene hot-melt glue, polypropylene glue, polysulfide, polyurethane, polyvinyl acetate, polyvinyl alcohol, polyvinyl chloride, polyvinylpyrrolidone, rubber cement, silicone, styrene acrylate copolymer, or a combination thereof. In some examples, the second adhesive material can comprise solvent-based adhesive. In some examples, the second adhesive material can comprise wet paint or primer, partially dried paint or primer, or other coating material(s).

The second adhesive material can be selected based on desired adhesion strength to the at least one non-carbon-based topological insulator. The adhesion strength of the second adhesive material to the at least one non-carbon-based topological insulator can be measured in any manner not inconsistent with the present application. The adhesion strength of the second adhesive material to the at least one non-carbon-based topological insulator can be measured according to ASTM International Standard D4541 and/or ISO Standard 4624. The second adhesive material can have an adhesion strength to the at least one non-carbon-based topological insulator that is greater than, equal to, or less than the inter-sheet bonding energy of the at least one non-carbon-based topological insulator. Selecting an adhesive material having an adhesion strength that is equal to or less than the inter-sheet bonding energy, for example, can permit the permit the removal of some, but not all, of a topological insulator layer from a substrate surface with adherent characteristics or from an adhesive surface by, for example, rolling an adhesive roller over the topological insulator layer. The methods described herein can provide simple and cost-effective methods of forming a coating that comprises the at least one non-carbon-based topological insulator, including over large areas.

In some examples, the second adhesive material can be the same as the first adhesive material. Thus, the adhesion strength of the second adhesive material to the at least one non-carbon-based topological insulator can be equal to the adhesion strength of the first adhesive material to the at least one non-carbon-based topological insulator.

In some examples, the second adhesive material can differ from the first adhesive material. Thus, the adhesion strength of the second adhesive material to the at least one non-carbon-based topological insulator can be greater than, equal to, or less than the adhesion strength of the first adhesive material to the at least one non-carbon-based topological insulator.

The adhesion strength of the second adhesive material to the at least one non-carbon-based topological insulator can be less than or equal to the adhesion strength of the first adhesive material to the at least one non-carbon-based topological insulator. Selecting an adhesive material having such an adhesion strength can permit the removal of some, but not all, of a topological insulator layer from a substrate surface with adherent characteristics or from an adhesive surface by, for example, rolling an adhesive roller over the topological insulator layer. In some examples, the methods described herein can provide simple and cost-effective methods of forming a coating that comprises the at least one non-carbon-based topological insulator, including over large areas.

In some examples, a ratio of the adhesion strength of the second adhesive material to the adhesion strength of the first adhesive material can be greater than or equal to 0.1:1 and less than or equal to 1:1. In some examples, the ratio of the adhesion strength of the second adhesive material to the adhesion strength of the first adhesive material can be greater than or equal to 0.1:1, greater than or equal to 0.3:1, greater than or equal to 0.5:1, greater than or equal to 0.7:1, or greater than or equal to 0.9:1.

In some examples, a ratio of the adhesion strength of the second adhesive material to the adhesion strength of the first adhesive material can be greater than or equal to 0.1:1 and less than 1:1. In some examples, the ratio of the adhesion strength of the second adhesive material to the adhesion strength of the first adhesive material can be greater than or equal to about 0.2:1 and less than or equal to about 0.4:1, greater than or equal to about 0.4:1 and less than or equal to about 0.6:1, greater than or equal to about 0.6:1 and less than or equal to about 0.8:1, or greater than or equal to about 0.8:1 and less than or equal to about 0.99:1. In some examples, the ratio of the adhesion strength of the second adhesive material to the adhesion strength of the first adhesive material can be greater than or equal to about 0.1:1 and less than or equal to about 0.5:1, greater than or equal to about 0.3:1 and less than or equal to about 0.7:1, greater than or equal to about 0.5:1 and less than or equal to about 0.9:1, or greater than or equal to about 0.7:1 and less than or equal to about 0.99:1.

A final coating can have any thickness not inconsistent with the present application. The thickness of the topological insulator layer can be selected by varying one or more parameters during deposition of the topological insulator layer. For example, a user can vary the number of times with which a source of the at least one non-carbon-based topological insulator is applied to the substrate surface with adherent characteristics or the force with which the source of the at least one non-carbon-based topological insulator is applied to or rolled over the substrate surface with adherent characteristics.

In some examples, the final coating can have an average thickness of about 1 nm, about 2 nm, about 3 nm, about 4 nm, about 5 nm, about 6 nm, about 7 nm, about 8 nm, about 9 nm, or about 10 nm. In some examples, the final coating can have an average thickness of up to about 10 nm, up to about 20 nm, up to about 30 nm, up to about 40 nm, up to about 50 nm, up to about 60 nm, up to about 70 nm, up to about 80 nm, up to about 90 nm, or about 100 nm. In some examples, the final coating can have an average thickness of up to about 100 nm, up to about 200 nm, up to about 300 nm, up to about 400 nm, up to about 500 nm, up to about 600 nm, up to about 700 nm, up to about 800 nm, up to about 900 nm, or about 1,000 nm.

In some examples, the final coating can have an average thickness of up to about 1 µm, up to about 2 µm, up to about 3 µm, up to about 4 µm, up to about 5 µm, up to about 6 µm, up to about 7 µm, up to about 8 µm, up to about 9 µm, or about 10 µm. In some examples, the final coating can have an average thickness of up to about 10 µm, up to about 20 µm, up to about 30 µm, up to about 40 µm, up to about 50 µm, up to about 60 µm, up to about 70 µm, up to about 80 µm, up to about 90 µm, or about 100 µm. In some examples, the final coating can have an average thickness of up to about 100 µm, up to about 200 µm, up to about 300 µm, up to about 400 µm, up to about 500 µm, up to about 600 µm, up to about 700 µm, up to about 800 µm, up to about 900 µm, or about 1,000 µm.

In some examples, the final coating can have an average thickness of up to about 1 millimeter ("mm"), up to about 2 mm, up to about 3 mm, up to about 4 mm, or up to about 5 mm. In some examples, the final coating can have an average thickness greater than or equal to about 1 mm and less than or equal to about 5 mm.

In some examples, the final coating can have an average thickness greater than or equal to about 1 nm and less than or equal to about 10 nm. In some examples, the final coating can have an average thickness greater than or equal to about 10 nm and less than or equal to about 100 nm. In some examples, the final coating can have an average thickness greater than or equal to about 100 nm and less than or equal to about 1,000 nm.

In some examples, the final coating can have an average thickness greater than or equal to about 1 µm and less than or equal to about 10 µm. In some examples, the final coating can have an average thickness greater than or equal to about 10 µm and less than or equal to about 100 µm. In some examples, the final coating can have an average thickness greater than or equal to about 100 µm and less than or equal to about 1,000 µm. In some examples, the final coating can have an average thickness greater than or equal to about 1 mm and less than or equal to about 5 mm.

The final coating can include an outer coating, such as a polymer coating. The polymer coating can provide protection from the environment (e.g., ultraviolet radiation); can improve electrical, mechanical, or optical properties; can enhance chemical resistance, corrosion resistance, fire resistance, or fire retardancy; can provide hydrophilic or hydrophobic characteristics; can reduce drag and/or friction; and/or can promote laminar flow of a fluid (e.g., air, water) over the outer coating.

Figure 1C:
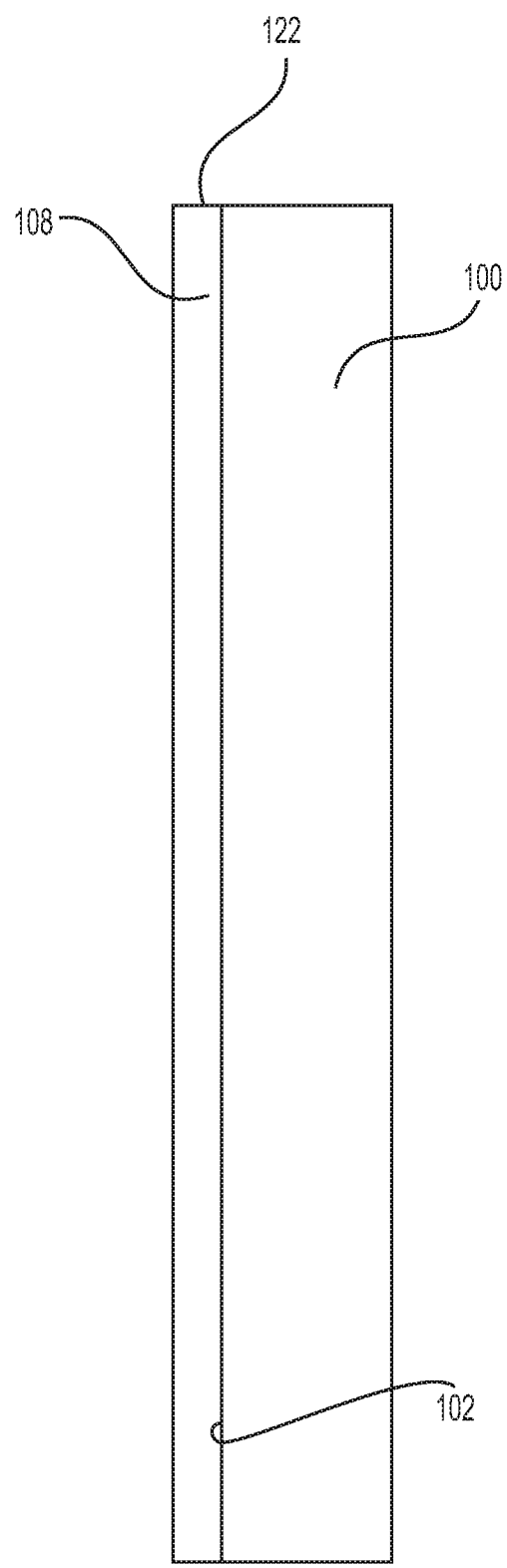
FIG. 1C shows a sectional view of components involved in a method of and/or a system for forming a coating, according to some examples of the disclosed methods and systems.

FIGS. 1A-1C show sectional views of components involved in a method of and/or a system for forming a coating, according to some examples of the disclosed methods and systems. As shown in FIG. 1A, substrate 100 has surface 102. Surface 102 can be prepared with adherent characteristics. The preparing of surface 102 can comprise selecting substrate 100 inherently having adherent characteristics with respect to at least one non-carbon-based topological insulator. The adherent characteristics of surface 102 can be improved, for example, by roughening surface 102, by treating surface 102 with one or more chemicals, and/or by other processes understood by one of ordinary skill in the art.

As shown in FIG. 1A, the at least one non-carbon-based topological insulator can be applied directly to surface 102 to provide a topological insulator layer on surface 102. First apparatus 104, comprising source 106 of at least one non-carbon-based topological insulator 108, can be rolled over surface 102 to provide a topological insulator layer on surface 102. First apparatus 104 can comprise first handle 110, and source 106 of at least one non-carbon-based topological insulator 108 can be attached to first handle 110. User 112 can use first apparatus 104 to manually roll source 106 of at least one non-carbon-based topological insulator 108 over surface 102. However, it also can be possible to roll source 106 of at least one non-carbon-based topological insulator 108 over surface 102 using, for example, an automated, mechanized, or robotic apparatus.

Although FIGS. 1A, 1B, 2B, and 2C depict user 112 as a human hand, user 112 may be an end effector(s), robot(s), or the like configured to operate on and/or cooperate with first handle 110, second handle 120, first handle 210, and/or second handle 220.

As shown in FIG. 1B, at least one non-carbon-based topological insulator 108 can be applied to surface 102 to provide topological insulator layer 114 on surface 102.

Following deposition of topological insulator layer 114, second apparatus 116 comprising adhesive roller 118 optionally can be rolled over topological insulator layer 114 to remove some, but not all, of topological insulator layer 114 to provide a final coating. As shown in FIG. 1B, second apparatus 116 can comprise second handle 120 to which adhesive roller 118 is attached. User 112 (may or may not be the same as the user of first apparatus 104) can use second apparatus 116 to manually roll adhesive roller 118 over topological insulator layer 114 to provide the final coating. However, it also can be possible to roll adhesive roller 118 over topological insulator layer 114 using, for example, an automated, mechanized, or robotic apparatus.

As shown in FIG. 1C, final coating 122 can have a lower average thickness than topological insulator layer 114.

Figure 2A:
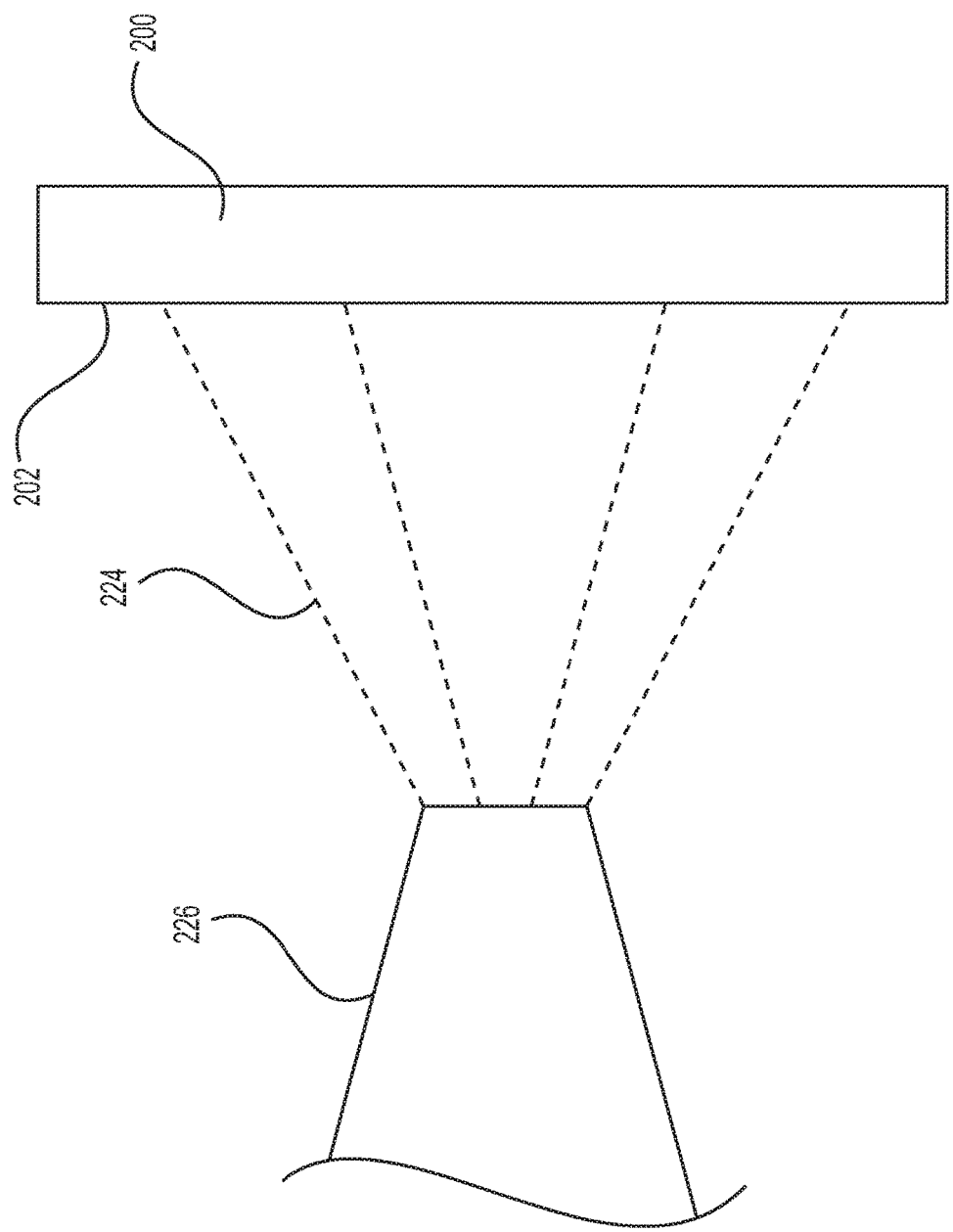
FIG. 2A shows a sectional view of components involved in a method of and/or a system for forming a coating, according to some examples of the disclosed methods and systems.

FIGS. 2A-2D show sectional views of components involved in a method of and/or a system for forming a coating, according to some examples of the disclosed methods and systems. As shown in FIG. 2A, substrate 200 has surface 202. Surface 202 can be prepared with adherent characteristics. The preparing of surface 202 can comprise applying first adhesive material 224 to surface 202 to provide an adhesive surface. As shown in FIG. 2A, first adhesive material 224 can be sprayed from nozzle 226 onto surface 202. However, first adhesive material 224 can be applied in any manner not inconsistent with the present application. For example, first adhesive material 224 can be brushed, daubed, or rolled onto surface 202. In another example, surface 202 and/or substrate 200 can be dipped into first adhesive material 224. The bonding of first adhesive material 224 to surface 202 can be improved, for example, by roughening surface 202, by treating surface 202 with one or more chemicals, and/or by other processes understood by one of ordinary skill in the art.

Figure 2B:
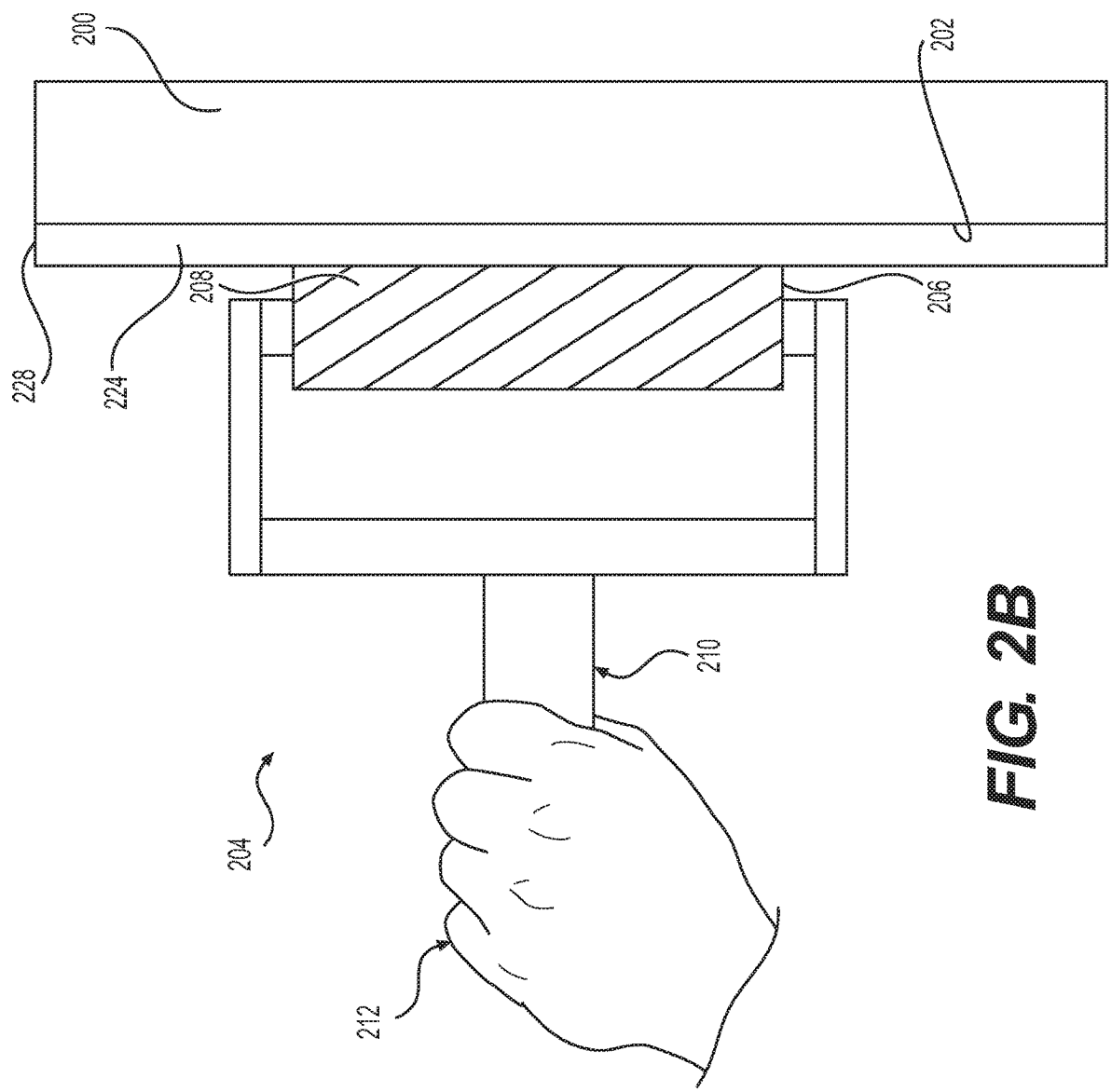
FIG. 2B shows a sectional view of components involved in a method of and/or a system for forming a coating, according to some examples of the disclosed methods and systems.

As shown in FIG. 2B, first adhesive material 224 can provide adhesive surface 228 on surface 202.

As shown in FIG. 2B, the at least one non-carbon-based topological insulator can be applied directly to adhesive surface 228 to provide a topological insulator layer on adhesive surface 228. First apparatus 204, comprising source 206 of at least one non-carbon-based topological insulator 208, can be rolled over adhesive surface 228 to provide a topological insulator layer on adhesive surface 228. First apparatus 204 can comprise first handle 210, and source 206 of at least one non-carbon-based topological insulator 208 can be attached to first handle 210. User 212 can use first apparatus 204 to manually roll source 206 of at least one non-carbon-based topological insulator 208 over adhesive surface 228. However, it also can be possible to roll source 206 of at least one non-carbon-based topological insulator 208 over adhesive surface 228 using, for example, an automated, mechanized, or robotic apparatus.

Figure 2C:
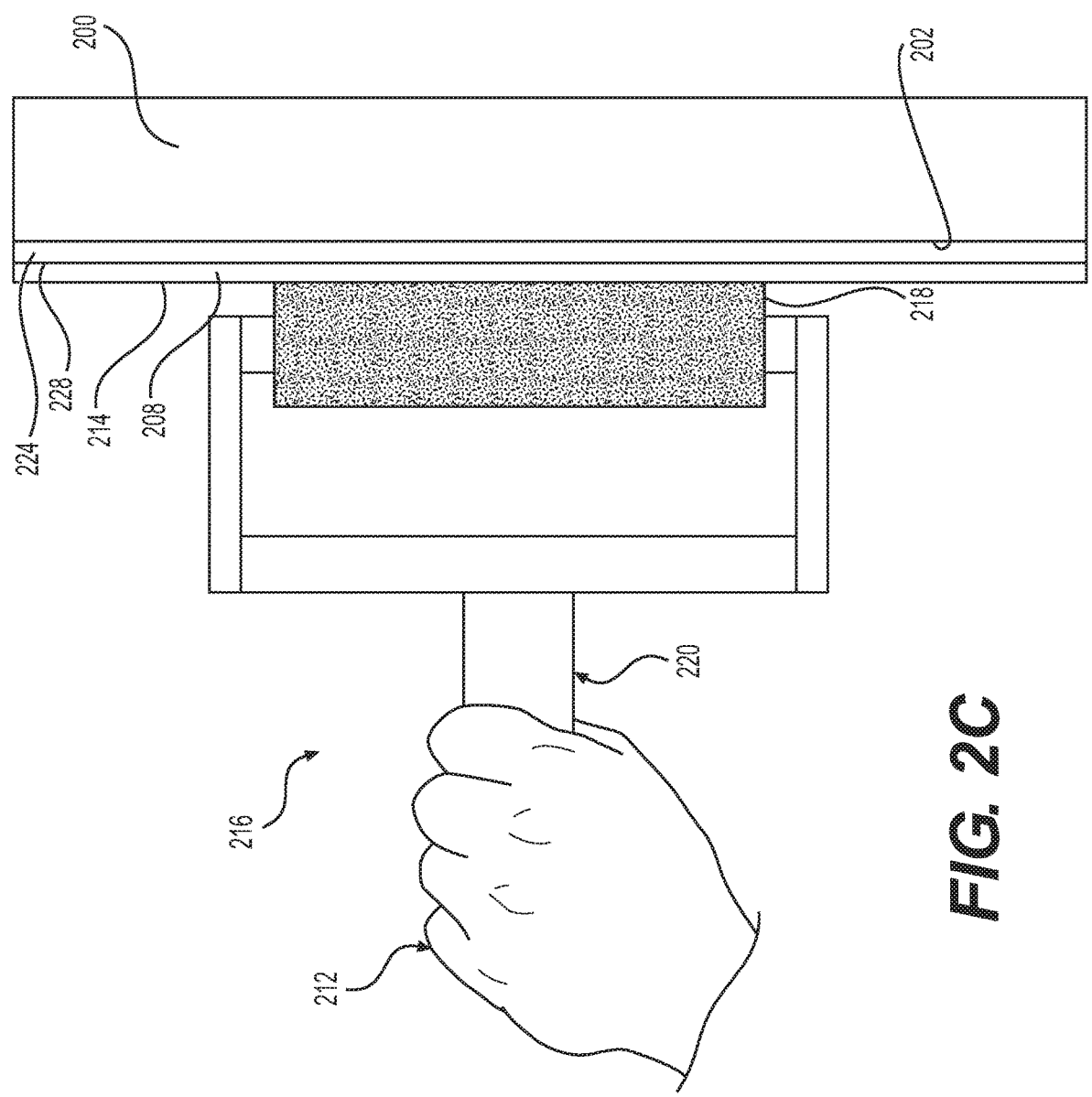
FIG. 2C shows a sectional view of components involved in a method of and/or a system for forming a coating, according to some examples of the disclosed methods and systems.

As shown in FIG. 2C, at least one non-carbon-based topological insulator 208 can be applied to adhesive surface 228 to provide topological insulator layer 214 on adhesive surface 228.

Following deposition of topological insulator layer 214, second apparatus 216 comprising adhesive roller 218 optionally can be rolled over topological insulator layer 214 to remove some, but not all, of topological insulator layer 214 to provide a final coating. As shown in FIG. 2C, second apparatus 216 can comprise second handle 220 to which adhesive roller 218 is attached. User 212 (may or may not be the same as the user of first apparatus 204) can use second apparatus 216 to manually roll adhesive roller 218 over topological insulator layer 214 to provide the final coating. However, it also can be possible to roll adhesive roller 218 over topological insulator layer 214 using, for example, an automated, mechanized, or robotic apparatus.

Figure 2D:
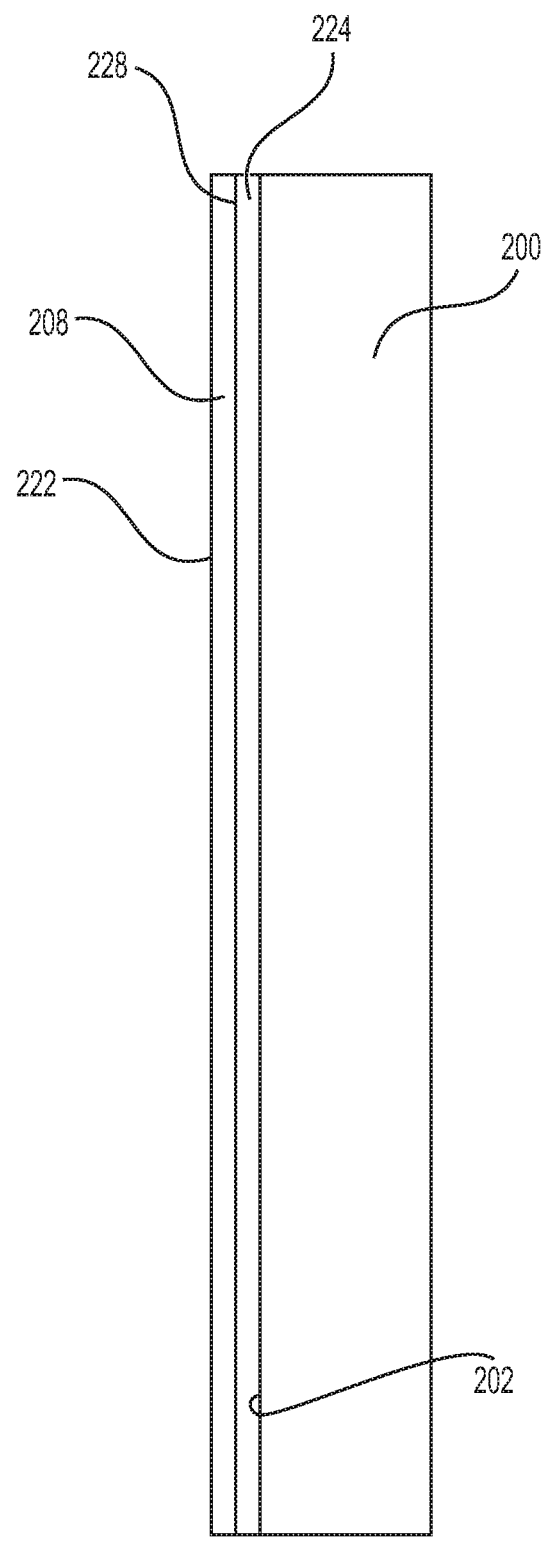
FIG. 2D shows a sectional view of components involved in a method of and/or a system for forming a coating, according to some examples of the disclosed methods and systems.

As shown in FIG. 2D, final coating 222 can have a lower average thickness than topological insulator layer 214.

As shown in FIGS. 1A and 2B, source 106 and source 206 can have substantially cylindrical morphologies. Such cylindrical morphologies, in some instances, can be especially suitable for use with a substantially flat or planar surface, such as substrate surface 102 in FIG. 1A or adhesive surface 228 in FIG. 2B. However, other configurations are possible.

Similarly, as shown in FIGS. 1B and 2C, adhesive roller 118 and adhesive roller 218 can have substantially cylindrical morphologies. Such cylindrical morphologies, in some instances, can be especially suitable for use with a substantially flat or planar substrate surface, such as the surface of topological insulator layer 114 in FIG. 1B or the surface of topological insulator layer 214 in FIG. 2C. However, other configurations are possible.

Source 106, source 206, adhesive roller 118, and/or adhesive roller 218 can be especially suitable for use with substrate surfaces that are not substantially flat or planar, as shown in FIGS. 3-6. FIGS. 3-6 show components involved in a method of forming a coating, according to some examples of the disclosed methods.

FIGS. 3-6 show sectional views of components involved in a method of and/or a system for forming a coating, according to some examples of the disclosed methods and systems.

Figure 3:
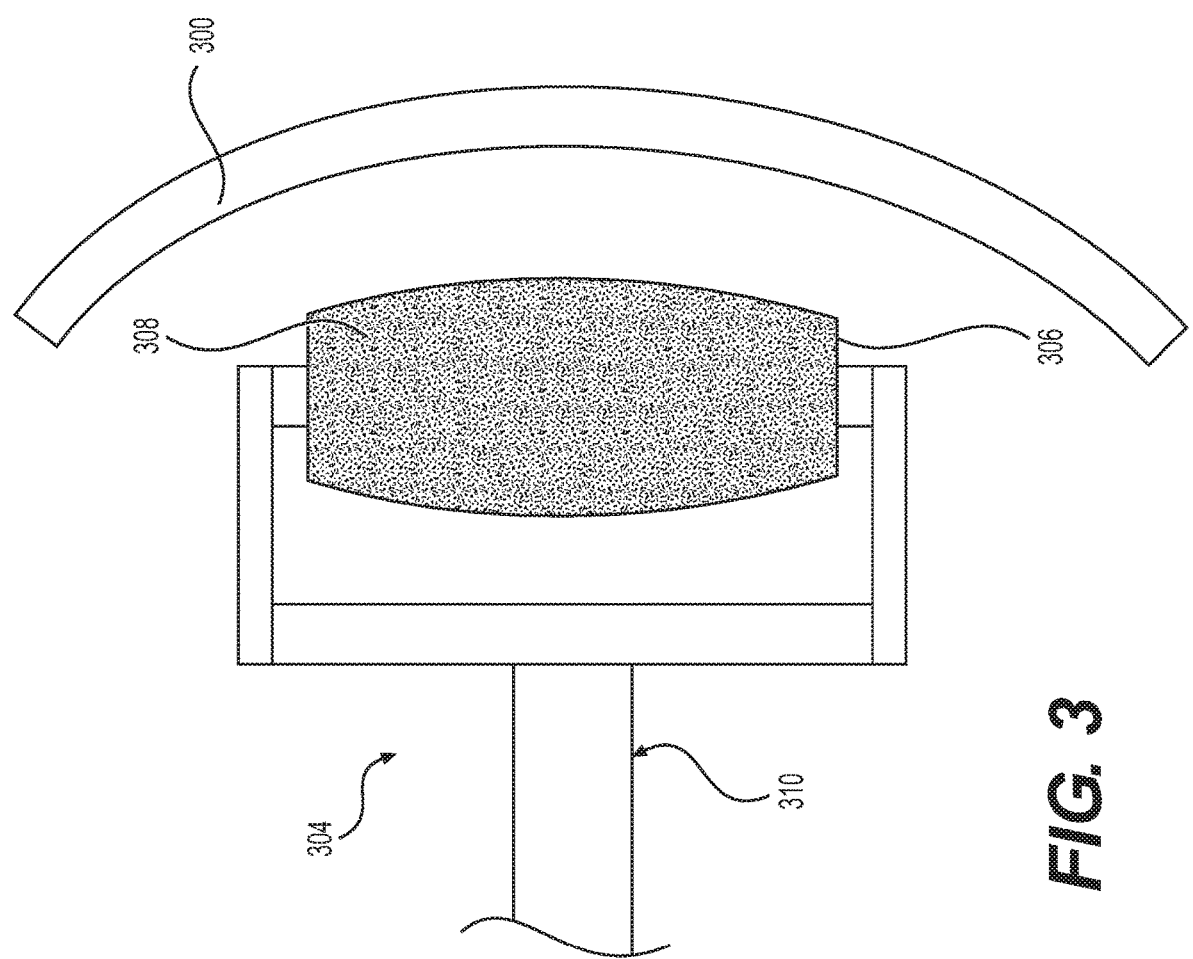
FIG. 3 shows a sectional view of components involved in a method of and/or a system for forming a coating, according to some examples of the disclosed methods and systems.

As shown in FIG. 3, for example, first apparatus 304 can comprise handle 310, and source 306 of at least one non-carbon-based topological insulator 308 attached to handle 310. Source 306 can be, for example, relatively stiff with a cross-section resembling the shape of a convex lens (e.g., a prolate or oblate spheroid), relatively flexible and shaped as a right circular cylinder, or something in between. Source 306 can be configured to roll along a curved surface—a substrate surface of or an adhesive surface on—substrate 300 when handle 310 is moved in a direction tangential to the curved surface of substrate 300, such as a direction perpendicular to the plane of the paper in FIG. 3.

As shown in FIG. 3, the curved surface of substrate 300 can be concave. Independent of stiffness/flexibility, source 306 can be configured such that the curvature of source 306 in contact with the curved surface of substrate 300 matches the curvature of the curved surface of substrate 300 in a complementary manner.

Instead of source 306 of at least one non-carbon-based topological insulator 308 attached to handle 310, an adhesive roller can be attached instead. The adhesive roller can be, for example, can be relatively stiff with a cross-section resembling the shape of a convex lens (e.g., a prolate spheroid), relatively flexible and shaped as a right circular cylinder, or something in between. The adhesive roller can be configured to roll along a curved surface of a topological insulator layer when handle 310 is moved in a direction tangential to the curved surface of the topological insulator layer, such as a direction perpendicular to the plane of the paper in FIG. 3.

Independent of its stiffness/flexibility, the adhesive roller can be configured such that the curvature of the adhesive roller in contact with the curved surface of the topological insulator layer matches the curvature of the curved surface of the topological insulator layer in a complementary manner.

Figure 4:
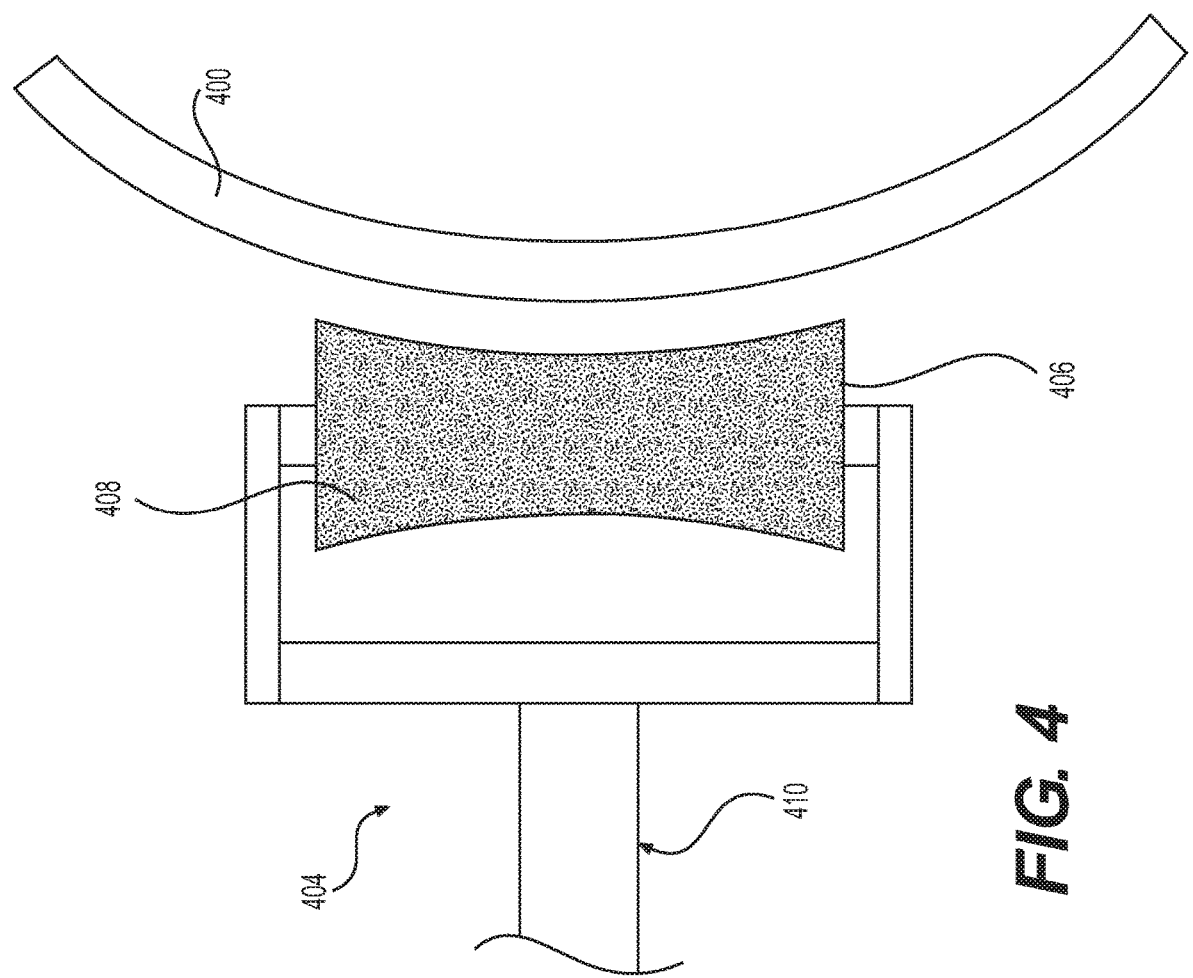
FIG. 4 shows a sectional view of components involved in a method of and/or a system for forming a coating, according to some examples of the disclosed methods and systems.

As shown in FIG. 4, for example, first apparatus 404 can comprise handle 410, and source 406 of at least one non-carbon-based topological insulator 408 attached to handle 410. Source 406 can be, for example, relatively stiff with a cross-section resembling the shape of a concave lens, relatively flexible and shaped as a right circular cylinder, or something in between. Source 406 can be configured to roll along a curved surface—a substrate surface of or an adhesive surface on—substrate 400 when handle 410 is moved in a direction tangential to the curved surface of substrate 400, such as a direction perpendicular to the plane of the paper in FIG. 4.

As shown in FIG. 4, the curved surface of substrate 400 can be convex. Independent of stiffness/flexibility, source 406 can be configured such that the curvature of source 406 in contact with the curved surface of substrate 400 matches the curvature of the curved surface of substrate 400 in a complementary manner.

Instead of source 406 of at least one non-carbon-based topological insulator 408 attached to handle 410, an adhesive roller can be attached instead. The adhesive roller can be, for example, relatively stiff with a cross-section resembling the shape of a concave lens, relatively flexible and shaped as a right circular cylinder, or something in between. The adhesive roller can be configured to roll along a curved surface of a topological insulator layer when handle 410 is moved in a direction tangential to the curved surface of the topological insulator layer, such as a direction perpendicular to the plane of the paper in FIG. 4.

Independent of its stiffness/flexibility, the adhesive roller can be configured such that the curvature of the adhesive roller in contact with the curved surface of the topological insulator layer matches the curvature of the curved surface of the topological insulator layer in a complementary manner.

Figure 5:
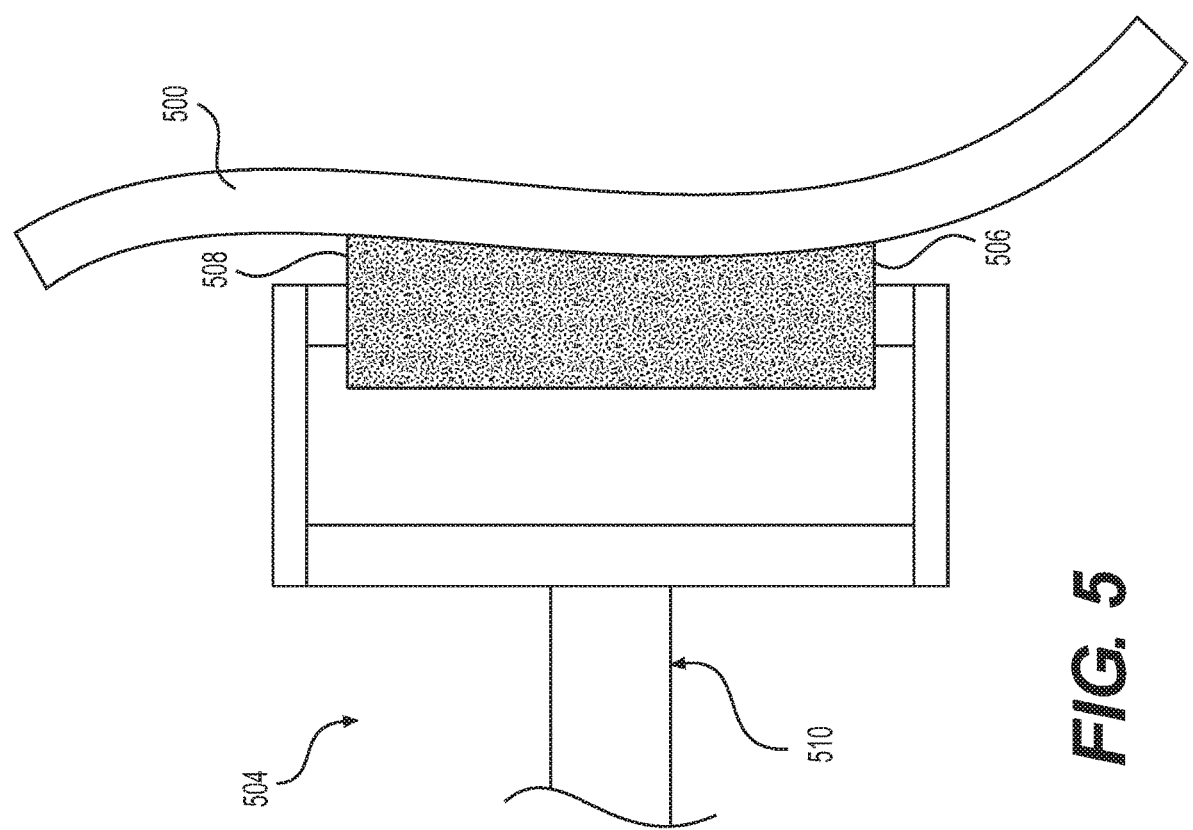
FIG. 5 shows a sectional view of components involved in a method of and/or a system for forming a coating, according to some examples of the disclosed methods and systems.

As shown in FIG. 5, for example, first apparatus 504 can comprise handle 510, and source 506 of at least one non-carbon-based topological insulator 508 attached to handle 510. Source 506 can be, for example, relatively flexible and shaped as a right circular cylinder. Source 506 can be configured to roll along a curved surface—a substrate surface of or an adhesive surface on—substrate 500 when handle 510 is moved in a direction tangential to the curved surface of substrate 500, such as a direction perpendicular to the plane of the paper in FIG. 5.

As shown in FIG. 5, the curved surface of substrate 500 can be complex (e.g., both concave and convex). Independent of stiffness/flexibility, source 506 can be configured such that the curvature of source 506 in contact with the curved surface of substrate 500 matches the curvature of the curved surface of substrate 500 in a complementary manner.

Instead of source 506 of at least one non-carbon-based topological insulator 508 attached to handle 510, an adhesive roller can be attached instead. The adhesive roller, for example, can be relatively flexible and shaped as a right circular cylinder. The adhesive roller can be configured to roll along a curved surface of a topological insulator layer when handle 510 is moved in a direction tangential to the curved surface of the topological insulator layer, such as a direction perpendicular to the plane of the paper in FIG. 5.

Independent of its stiffness/flexibility, the adhesive roller can be configured such that the curvature of the adhesive roller in contact with the curved surface of the topological insulator layer matches the curvature of the curved surface of the topological insulator layer in a complementary manner.

Figure 6:
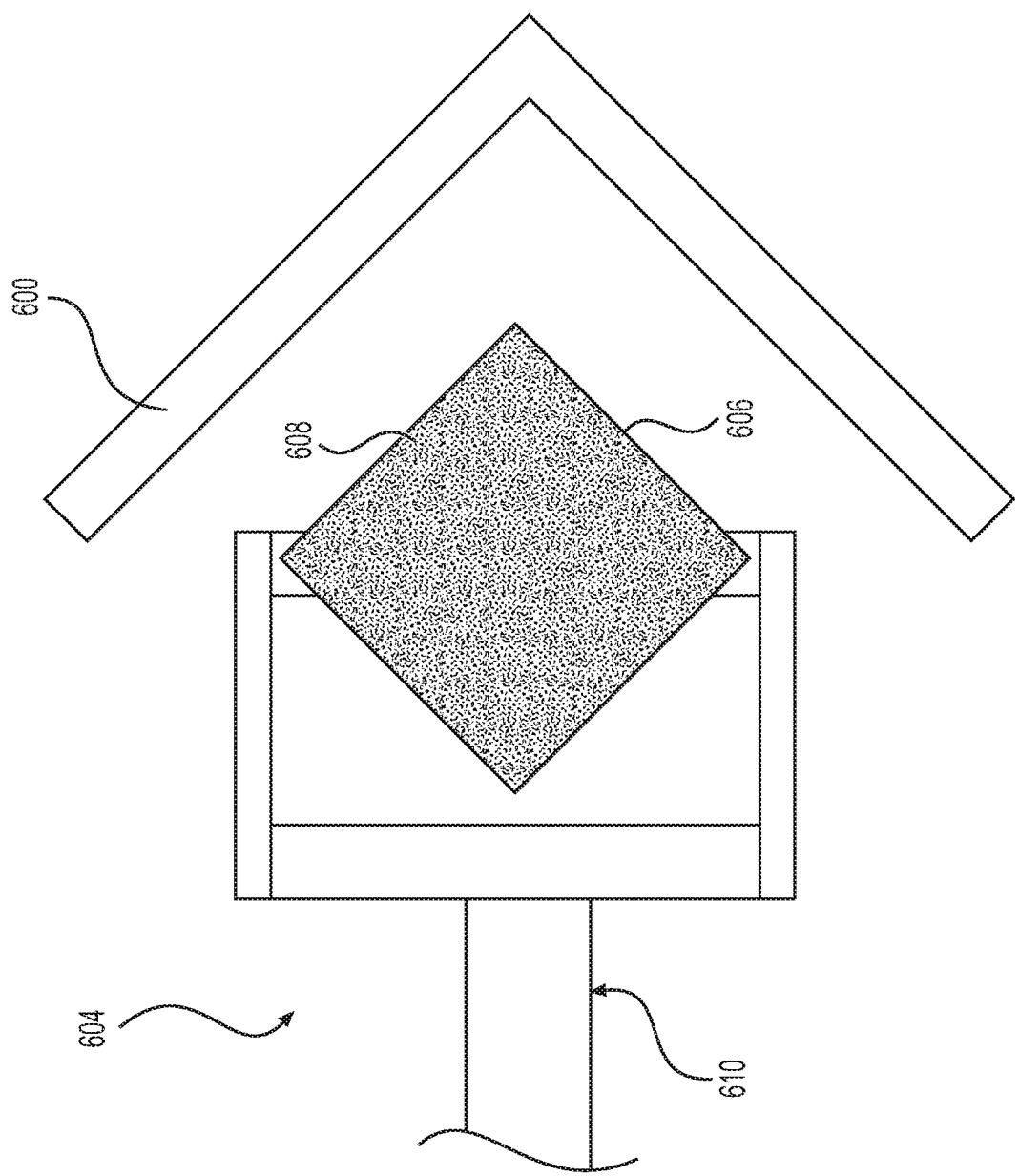
FIG. 6 shows a sectional view of components involved in a method of and/or a system for forming a coating, according to some examples of the disclosed methods and systems.

As shown in FIG. 6, for example, first apparatus 604 can comprise handle 610, and source 606 of at least one non-carbon-based topological insulator 608 attached to handle 610. Source 606 can be, for example, relatively stiff or relatively flexible with a cross-section resembling a diamond-like shape. Source 606 can be configured to roll along a sharply angled surface (e.g., a corner)—a substrate surface of or an adhesive surface on—substrate 600 when handle 610 is moved in a direction tangential to the curved surface of substrate 600, such as a direction perpendicular to the plane of the paper in FIG. 6.

As shown in FIG. 6, the curved surface of substrate 600 can be sharply angled. Independent of stiffness/flexibility, source 606 can be configured such that the curvature of source 606 in contact with the curved surface of substrate 600 matches the curvature of the curved surface of substrate 600 in a complementary manner.

Instead of source 606 of at least one non-carbon-based topological insulator 608 attached to handle 610, an adhesive roller can be attached instead. The adhesive roller, for example, can be relatively stiff or relatively flexible with a cross-section resembling a diamond-like shape. The adhesive roller can be configured to roll along the sharply angled surface surface of a topological insulator layer when handle 610 is moved in a direction tangential to the curved surface of the topological insulator layer, such as a direction perpendicular to the plane of the paper in FIG. 6.

Independent of its stiffness/flexibility, the adhesive roller can be configured such that the curvature of the adhesive roller in contact with the curved surface of the topological insulator layer matches the curvature of the curved surface of the topological insulator layer in a complementary manner.

FIG. 7 shows a perspective view of components involved in a method of and/or a system for forming a coating, according to some examples of the disclosed methods and systems, while FIG. 8 shows a sectional view of components involved in a method of and/or a system for forming a coating, according to some examples of the disclosed methods and systems, taken along line 8-8 of FIG. 7. As shown in FIGS. 7 and 8, system 730 can comprise moveable support structure 732 and handle 710.

Moveable support structure 732 can comprise a track mechanism. For example, moveable support structure 732 can comprise guide rail holes 734 configured to couple to one or more guide rails 736 of system 730.

As shown in FIG. 7, one or more guide rails 736 can be between first scaffold 738 and second scaffold 740. One or more guide rails 736 can be configured to permit the movement of moveable support structure 732, handle 710, and source 706 of at least one non-carbon-based topological insulator 708 attached to handle 710 along the length of one or more guide rails 736.

System 730 can further comprise one or more motors (not shown) and a controller (not shown) configured to control and power the movement of moveable support structure 732, handle 710, and source 706 of at least one non-carbon-based topological insulator 708 along the length of one or more guide rails 736. By moving moveable support structure 732, handle 710, and source 706 of at least one non-carbon-based topological insulator 708 along the length of one or more guide rails 736 between first scaffold 738 and second scaffold 740, system 730 can provide a coating comprising at least one non-carbon-based topological insulator on a surface 742 of a large object such as an airplane 744 in a rapid, efficient, and cost-effective manner.

A topological insulator remover (e.g., adhesive roller) can be used in place of source 706 of at least one non-carbon-based topological insulator 708 in order to remove some, but not all, of a topological insulator layer formed using, for example, source 706 of at least one non-carbon-based topological insulator 708.

First scaffold 738 and second scaffold 740 can be configured to move in one or more dimensions, such as in a vertical dimension or to trace a curve. First scaffold 738 and second scaffold 740 also can be equipped, for example, with a robotic arm for multi-dimensional movement.

Potential dopants for topological insulators include, for example, semiconductors, rare earth elements, transition metals, and/or other elements. Such semiconductors can include, for example, germanium ("Ge"), silicon ("Si"), and silicon-germanium alloys (e.g., $Si_{1-x}Ge_x$ (0<x<1)). Such rare earth elements can include, for example, cerium ("Ce"), dysprosium ("Dy"), erbium ("Er"), europium ("Eu"), gadolinium ("Gd"), holmium ("Ho"), lanthanum ("La"), lutetium ("Lu"), neodymium ("Nd"), praseodymium ("Pr"), promethium ("Pm"), samarium ("Sm"), scandium ("Sc"), terbium ("Tb"), thulium ("Tm"), ytterbium ("Yb"), and yttrium ("Y"). Such transition metals can include, for example, bohrium ("Bh"), cadmium ("Cd"), chromium ("Cr"), cobalt ("Co"), copernicium ("Cn"), copper ("Cu"), darmstadtium ("Ds"), dubnium ("Db"), gold ("Au"), hafnium ("Hf"), hassium ("Hs"), iridium ("Ir"), iron ("Fe"), manganese ("Mn"), meitnerium ("Mt"), mercury ("Hg"), molybdenum ("Mo"), nickel ("Ni"), niobium ("Nb"), osmium ("Os"), palladium ("Pd"), platinum ("Pt"), rhenium ("Re"), rhodium ("Rh"), roentgenium ("Rg"), ruthenium ("Ru"), rutherfordium ("Rf"), seaborgium ("Sg"), silver ("Ag"), tantalum ("Ta"), technetium ("Tc"), titanium ("Ti"), tungsten ("W"), vanadium ("V"), zinc ("Zn"), and zirconium ("Zr"). Such other elements can include, for example, antimony ("Sb"), calcium ("Ca"), magnesium ("Mg"), oxygen ("O"), strontium ("Sr"), and tin ("Sn").

The doping can comprise, for example, interstitial doping of a crystal structure of at least one 2D or 3D, non-carbon-based topological insulator. Such doping can break the time-reversal symmetry of the at least one 2D or 3D, non-carbon-based topological insulator.

$Bi_2Se_3$ can be doped, for example, with one or more of Ca, Cr, Cu, Dy, Fe, Gd, Ho, Mg, Mn, Ni, Sb, or Sm (e.g., $Bi_{1.84-x}Fe_{0.16}Ca_xSe_3$ (0≤x<1.84), $(Ho_xBi_{1-x})_2Se_3$ (0≤x≤0.21)). $Bi_2Te_3$ can be doped, for example, with one or more of Cr, Dy, Fe, Gd, Ho, Mn, Sb, Sm, or Sn (e.g., $Cr_{0.08}(Bi_{0.1}Sb_{0.9})_{1.92}Te_3$, $(Dy_xBi_{1-x})_2Te_3$ (0<x<1)). $Sb_2Te_3$ can be doped, for example, with one or both of Cr or Mn. $(Bi,Sb)_2Te_3$ can be doped, for example, with one or both of Cr or V.

In some examples, substrates are coated with at least one non-carbon-based topological insulator. In some examples, the coated substrate can comprise a substrate surface, and a layer of the at least one non-carbon-based topological insulator directly on the substrate surface. In some examples, the coated substrate can comprise a substrate surface, an adhesive material on the substrate surface, and a layer of the at least one non-carbon-based topological insulator on the adhesive material. Whether adhesive is present or not, the at least one non-carbon-based topological insulator can be adjacent to the substrate surface.

As used herein, the term "adjacent" means "near or directly contacting."

In some examples, the coated substrate can comprise a substrate surface; two or more layers of the at least one non-carbon-based topological insulator; and one or more layers of adhesive material. In some examples, the coated substrate can comprise a substrate surface, a first layer of the at least one non-carbon-based topological insulator directly on the substrate surface, an adhesive material on the first layer, and a second layer of the at least one non-carbon-based topological insulator on the adhesive material. In some examples, further layers of adhesive and non-carbon-based topological insulator can be added, as understood by one of ordinary skill in the art.

In some examples, the coated substrate can comprise a substrate surface, a first adhesive material on the substrate surface, a first layer of the at least one non-carbon-based topological insulator on the first adhesive material, a second adhesive material on the first layer, and a second layer of the at least one non-carbon-based topological insulator on the second adhesive material. Further layers of adhesive and non-carbon-based topological insulator can be added, as understood by one of ordinary skill in the art.

A polymer or other final coating can be added to the coated substrate.

The coated substrates can be formed using the methods and/or apparatuses discussed above. The coated substrates can comprise the adhesive materials, non-carbon-based topological insulators, and/or substrate surfaces discussed above.

Although examples have been shown and described in this specification and figures, it would be appreciated that changes can be made to the illustrated and/or described examples without departing from their principles and spirit, the scope of which is defined by the following claims and their equivalents.

What is claimed is:

1. A method of forming a coating, the method comprising:
preparing a substrate surface with adherent characteristics; and
applying at least one non-carbon-based topological insulator with selected optical transmittance to the substrate surface to provide a topological insulator layer on the substrate surface;
wherein the at least one non-carbon-based topological insulator comprises at least one three-dimensional, non-carbon-based topological insulator, and
wherein a single crystal layer of the at least one three-dimensional, non-carbon-based topological insulator is doped so as to achieve optical transmittance greater than or equal to 98% for electromagnetic radiation at normal incidence with a wavelength greater than or equal to 200 nanometers (nm) and less than or equal to 800 nm.

2. The method of claim 1, wherein the preparing of the substrate surface with the adherent characteristics comprises applying first adhesive material to the substrate surface to provide an adhesive surface.

3. The method of claim 2, wherein the applying of the at least one non-carbon-based topological insulator to the substrate surface comprises rolling a source of the at least one non-carbon-based topological insulator over the adhesive surface to provide the topological insulator layer on the adhesive surface.

4. The method of claim 1, further comprising:
rolling an adhesive roller over the topological insulator layer to remove some, but not all, of the topological insulator layer.

5. The method of claim 2, further comprising:
rolling an adhesive roller over the topological insulator layer to remove some, but not all, of the topological insulator layer;
wherein the adhesive roller comprises second adhesive material.

6. The method of claim 5, wherein the second adhesive material is the same as the first adhesive material.

7. The method of claim 5, wherein the second adhesive material differs from the first adhesive material.

8. The method of claim 1, wherein the applying of the at least one non-carbon-based topological insulator to the substrate surface comprises rolling a source of the at least one non-carbon-based topological insulator over the substrate surface to provide the topological insulator layer on the substrate surface.

9. A method of forming a coating, the method comprising:
preparing a substrate surface with adherent characteristics; and
applying at least one non-carbon-based topological insulator with selected optical transmittance to the substrate surface to provide a topological insulator layer on the substrate surface;
wherein the at least one non-carbon-based topological insulator comprises at least one three-dimensional, non-carbon-based topological insulator, and
wherein a single crystal layer of the at least one three-dimensional, non-carbon-based topological insulator is doped so as to achieve optical transmittance greater than or equal to 95% for electromagnetic radiation at normal incidence with a specific wavelength greater than or equal to 200 nanometers (nm) and less than or equal to 800 nm.

10. The method of claim 9, wherein the specific wavelength is 200 nm.

11. The method of claim 9, wherein the specific wavelength is 400 nm.

12. The method of claim 9, wherein the specific wavelength is 500 nm.

13. The method of claim 9, wherein the specific wavelength is 600 nm.

14. The method of claim 9, wherein the specific wavelength is 700 nm.

15. The method of claim 9, wherein the specific wavelength is 800 nm.

16. A method of forming a coating, the method comprising:
preparing a substrate surface with adherent characteristics; and
applying at least one non-carbon-based topological insulator with selected optical transmittance to the substrate surface to provide a topological insulator layer on the substrate surface;
wherein the at least one non-carbon-based topological insulator comprises at least one two-dimensional, non-carbon-based topological insulator, and
wherein a single crystal layer of the at least one two-dimensional, non-carbon-based topological insulator is doped so as to achieve optical transmittance greater than or equal to 95% for electromagnetic radiation at normal incidence with a wavelength greater than or equal to 200 nanometers (nm) and less than or equal to 800 nm.

17. The method of claim 16, wherein the preparing of the substrate surface with the adherent characteristics comprises applying first adhesive material to the substrate surface to provide an adhesive surface.

18. The method of claim 17, further comprising:
rolling an adhesive roller over the topological insulator layer to remove some, but not all, of the topological insulator layer;
wherein the adhesive roller comprises second adhesive material.

19. The method of claim 18, wherein the second adhesive material is the same as the first adhesive material.

20. The method of claim 18, wherein the second adhesive material differs from the first adhesive material.

* * * * *